US006577760B1

(12) United States Patent
Ohta et al.

(10) Patent No.: US 6,577,760 B1
(45) Date of Patent: Jun. 10, 2003

(54) IMAGE PROCESSING APPARATUS AND METHOD, IMAGE SYNTHESIZING SYSTEM AND METHOD, IMAGE SYNTHESIZER AND CLIENT COMPUTER WHICH CONSTITUTE IMAGE SYNTHESIZING SYSTEM, AND IMAGE SEPARATING METHOD

(75) Inventors: Yoshinori Ohta, Asaka (JP); Koichi Sakamoto, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/215,342

(22) Filed: Dec. 18, 1998

(30) Foreign Application Priority Data

Dec. 18, 1997 (JP) ............................ 9-363928
Dec. 18, 1997 (JP) ............................ 9-363929

(51) Int. Cl.$^7$ ................................. G09G 3/38
(52) U.S. Cl. ...................................... 382/167
(58) Field of Search .................. 382/167, 212–214, 382/282–284; 358/517, 538, 453; 345/100

(56) References Cited

U.S. PATENT DOCUMENTS

| 5,535,315 A | | 7/1996 | Itoh ............................ 345/593 |
| 5,574,511 A | | 11/1996 | Yang et al. .................. 348/586 |
| 5,844,539 A | * | 12/1998 | Kitagawa .................... 345/100 |
| 5,867,140 A | * | 2/1999 | Rader ......................... 345/100 |

FOREIGN PATENT DOCUMENTS

EP        0 756 426 A2     1/1997

* cited by examiner

*Primary Examiner*—Thomas D. Lee
*Assistant Examiner*—Stephen Brinich
(74) *Attorney, Agent, or Firm*—Birch, Stewart, Kolasch & Birch

(57) ABSTRACT

Alternatively, a set of pixel image data and a set of coordinate data are respectively compressed, and compressed pixel image data and the compressed coordinate data are stored. To perform proper color correction (conversion) even when a user image is inlaid in a template image to produce a composite image. A position, in which the user image is to be inlaid, on the template image is defined by mask information. The template image and the mask information are correlated with each other. The user image is inlaid in the position, on the template image, defined by the mask information, to produce a composite image. Data representing the produced composite image and the corresponding mask information are transmitted from a client computer to an image synthesizer. In the image synthesizer, the mask information is referred to, to separate the template image and the user image from the composite image. The template image and the user image, which have been separated from each other, are individually subjected to color correction in the image synthesizer. The template image and the user image, which have been respectively subjected to the color correction, are resynthesized.

14 Claims, 22 Drawing Sheets

IMAGE PROCESSING APPARATUS AND METHOD, IMAGE SYNTHESIZING SYSTEM AND METHOD, IMAGE SYNTHESIZER AND CLIENT COMPUTER WHICH CONSTITUTE IMAGE SYNTHESIZING SYSTEM, AND IMAGE SEPARATING METHOD

BACKGROUND OF THE INVENTION

1. Field of the Invention

The present invention relates to an image processing apparatus and method, particularly to an apparatus for and a method of extracting (cutting out) a desired image portion from an original image displayed on a screen of a display device, and an apparatus for and a method of further extracting a part of the partial image, moving the part of the image, and arranging (editing) or storing a plurality of partial images upon correlating with each other.

Further, the present invention relates to an image synthesizing system comprising a client computer and an image synthesizer which can communicate data to each other and an image synthesizing method in the image synthesizing system, the client computer and the image synthesizer which constitute the image synthesizing system, and an image separating method.

2. Description of the Background Art

The format of image data includes GIF (Graphic Interchange Format), EPSF (Encapsulated PostScript Format), and so forth.

A color is expressed using a color palette (e.g. of 256 colors) in the GIF. A desired part of an image (a partial image) can be specified in the original image of the GIF format. The contour of the partial image can be designated as desired. An area (background) other than the specified partial image in the original image is represented by a set of image data of a transparent color. The GIF format has such inconvenience that the specified partial image and the background image are always treated as an integrated image data. Further, an image which is expressed using colors close to colors in nature (e.g., 16,000,000 colors) (referred to as a natural image or a picture of a scene) cannot be represented by the GIF format.

The EPSF is suited for graphics and graphics is expressed by a vector. Since a picture of a scene hardly be expressed by a vector, the picture of a scene cannot be also handled in the EPSF format.

On the other hand, when a subject image (a user image) picked up by a still video camera, a movie video camera or the like is fetched into a computer, and a color image is printed using a color printer, image data representing the user image is subjected to color correction depending on the printing characteristics of the color printer.

With the development of the computer, it has been possible for a user himself or herself to inlay the user image, in a position, in which a user image is to be inlaid, on a template image representing the background of the user image. A composite image obtained by inlaying the user image in the template image can be also printed using a color printer that the user has.

Even in such a case, the characteristics of the color printer is known by the user, and the user himself or herself stores in the computer image data representing the user image and image data representing the template image. Therefore, it is possible to separately take out the user image data and the template image data, and separately subject the user image data and the template image data to color correction depending on the characteristics of the color printer prior to the synthesis of the user image and the template image.

The user image data which has been subjected to the color correction and the template image data which has been subjected to the color conversion are synthesized to produce the composite image data, so that the composite image obtained by the printing exhibits proper colors as a whole.

Consider an image synthesizing system comprising a client computer and an image synthesizer located at a place spaced apart from the client computer. In such a system, when a template image and a user image are synthesized as described above in the client computer, image data representing a composite image is transmitted from the client computer to the image synthesizer, and the composite image is printed using a color printer connected to the image synthesizer, it is difficult to separate the template image and the user image from the composite image in the image synthesizer. Since it is difficult to separate the template image and the user image from the composite image it is difficult to individually perform the most suitable color conversion (inclusive of color correction) conforming to the template image and the most suitable color conversion (inclusive of color correction) conforming to the user image in the image synthesizer.

When the whole of the composite image is subjected to color conversion, even if the color conversion is most suitable for the template image, the color conversion may be, in some cases, unfavorable for the user image, or vice versa.

SUMMARY OF THE INVENTION

An object of the present invention is to make it possible to handle, when a desired partial image having a desired shape is extracted (cut out) from an image, only the extracted partial image, i.e., independently from a background image (the remaining image portion).

Another object of the present invention is to make it possible to designate and extract (cut out) a partial image from not only a natural image (a picture of a scene) but also an image represented using a color palette.

Still another object of the present invention is to make it possible to further extract a part of the extracted partial image to obtain a plurality of partial images, and to define the positional relationship among the plurality of the partial images obtained by the extraction.

Still further object of the present invention is to make it possible to perform, even after a template image has been inlaid in a user image to produce a composite image, color conversion suitable for the template image and the user image individually.

The first invention is directed to an image processing apparatus, which comprises an image area designating device for designating an area to be extracted of an original image displayed on a display screen, color changing means for changing the color of an area, excluding the area to be extracted which has been designated by the image area designating device, of the displayed original image into a particular color, and storage controlling means for storing pixel data representing pixels having colors excluding the particular color obtained by the change in the color changing means in the displayed original image and coordinate data representing positions of the pixels in the displayed original image with the pixel data and the coordinate data correlated with each other.

The first invention provides an image processing method which comprises the steps of designating an area to be extracted of an original image displayed on a display screen, changing the color of an area, excluding the designated area to be extracted, of the displayed original image into a particular color, and storing pixel data representing pixels having colors excluding the particular color obtained by the change in the displayed original image and coordinate data representing positions of the pixels in the displayed original image with the pixel data and the coordinate data correlated with each other.

The first invention further provides a storage medium storing thereon a program for controlling a computer, the program causing the computer to accept an area to be extracted which is designated on an original image displayed on a display screen, to replace image data representing an image of an area excluding the accepted area to be extracted with image data representing a specified color on the image data of the original image, to generate pairs of pixel data and coordinate data from the image data excluding the image data representing the specified color, and to store the generated pairs of the pixel data and the coordinate data on a storage medium.

According to the first invention, since the image data in the area (background area) other than the area which has been specified to be extracted (cut out) are replaced with image data representing the particular color, the image data of the specified (designated) area can be easily obtained merely by extracting other image data than the image data which represent the particular color.

The pixel data (pixel image data) and the coordinate data are produced based on the extracted image data and are stored in correlation with each other. The extracted image data have coordinate data representing the position of the pixels in the image for each pixel, so that the extracted image data alone, that is, without accompanying image data representing the background, can be treated or handled. The image data representing the background can be dispense with or unnecessary. The coordinate data is for specifying the relative positions of the pixels in image. The coordinate data may be defined using any point on the extracted image (inclusive an area including the extracted image, e.g. a rectangle which circumscribes the extracted image) as an origin of the coordinate.

According to the first invention, it is possible to designate and to extract a partial image from not only an image represented using a color palette but also a natural image.

In the preferred embodiment, the pixel data and the coordinate data form pairs to be stored.

In another embodiment, a set of the pixel data is compressed, and a set of the coordinate data is compressed. The compressed pixel data and the compressed coordinate data are correlated with each other to be stored. The pixel data and the coordinate data are individually subjected to data compression respectively conforming to the characteristics or nature of the pixel data and coordinate data, so that efficient data compression can be achieved.

The first invention further provides a recording or storage medium having the above image data (pixel data and coordinate data) stored thereon.

One of the image data storage medium according to the first invention is the storage medium storing thereon pairs of pixel data and coordinate data representing pixels composing an image in the order represented by the coordinate data.

Another of the image data storage medium according to the first invention is the storage medium storing thereon compressed pixel data and compressed coordinate data which are obtained by respectively compressing such a group of pixel data and a group of coordinate data that the pixel data and the coordinate data representing pixels composing an image are arranged for pixel data and for coordinate data in the order represented by the coordinate data.

An apparatus for reproducing an image represented by the image data which has been stored in accordance with the first invention comprises data reading means for reading, from a storage medium storing image data comprising a set of pairs of pixel data representing pixels and coordinate data representing the positions of the pixels on the image, the pixel data and the coordinate data, and display controlling means for controlling a display device such that the image is displayed by displaying the pixels represented by the pixel data read by the data reading means in the positions represented by the coordinate data.

A method of reproducing an image comprises the steps of reading, from a storage medium storing image data comprising a set of pairs of pixel data representing pixels and coordinate data representing the positions of the pixels on the image, the pixel data and the coordinate data, and controlling a display device such that the image is displayed by displaying the pixels represented by the read pixel data in the positions represented by the corresponding read coordinate data.

An apparatus for reproducing an image represented by the compressed image data which has been prepared and stored in accordance with the first invention comprises data reading means for reading, from a storage medium storing thereon compressed pixel data and compressed coordinate data which are obtained by compressing a set of pixel data and by compressing a set of coordinate data in image data having a data structure such that pixels constituting an image are represented by pixel data and coordinate data, the compressed pixel data and the compressed coordinate data, pixel data expanding means for expanding the compressed pixel data read by the data reading means, coordinate data expanding means for expanding the compressed coordinate data read by the data reading means, and display control means for controlling a display device such that the image is displayed by displaying the pixels represented by the pixel data expanded by the pixel data expanding means in the positions represented by the coordinate data expanded by the coordinate data expanding means.

A method of reproducing the compressed image data comprises the steps of reading, from a storage medium storing thereon compressed pixel data and compressed coordinate data which are obtained by compressing a set of pixel data and by compressing a set of coordinate data in image data having a data structure such that pixels constituting an image are represented by pixel data and coordinate data, the compressed pixel data and the compressed coordinate data, expanding the read compressed pixel data, expanding the read compressed coordinate data, and controlling a display device such that the image is displayed by displaying the pixels represented by the expanded pixel data in the positions represented by the expanded coordinate data.

The second invention is directed an image processing apparatus, which comprises a designating device for designating on an image displayed on a display screen based on image data comprising pixel data representing pixels and coordinate data representing the positions of the pixels, a partial image to be moved, a movement value inputting device for inputting the direction of movement and the amount of movement of the partial image, movement amount adding means for adding the coordinate variation corresponding to the amount of movement in the direction of movement inputted by the movement value inputting device to the coordinate data of the pixels composing the partial image designated by the designating device, and storage controlling means for storing the new coordinate data obtained by the movement amount adding means and the pixel data corresponding thereto in correlation with each other as well as the coordinate data and the pixel data representing the image other than the partial image.

An image processing method according to the second invention comprises the steps of designating on an image displayed on a display screen based on image data comprising pixel data representing pixels and coordinate data representing the positions of the pixels, a partial image to be moved, inputting the direction of movement and the amount of movement of the partial image, adding the coordinate variation corresponding to the inputted amount of movement in the inputted direction of movement to the coordinate data of the pixels composing the designated partial image, and storing the new coordinate data obtained by the addition and the pixel data corresponding thereto in correlation with each other as well as the coordinate data and the pixel data representing the image other than the partial image.

The second invention further provides a storage medium storing thereon a program for controlling a computer, the program causing the computer to accept an area of a partial image designated on an image displayed on a display screen based on image data comprising pixel data representing pixels and coordinate data representing the positions of the pixels, to accept the direction of movement and the amount of movement of the partial image, to calculate new coordinate data by adding the coordinate variation corresponding to the accepted amount of movement in the accepted direction of movement to the coordinate data of the pixels composing the partial image of the accepted area, and to store the new coordinate data obtained by the calculation and the pixel data corresponding thereto in correlation with each other as well as the coordinate data and the pixel data representing the image other than the partial image.

In a preferred embodiment of the second invention, the partial image before movement disappears, and the partial image after movement appears at the positions defined by the new coordinate data on the screen of the display device. The user can recognize the position of the moved partial image.

According to the second invention, even in a case where a part of an image is extracted (cut out) and the extracted partial image is moved, the pixel data and the new coordinate data which represent the moved partial image are correlated with each other to be stored together with the pixel data and the coordinate data of the original image (exclusive of the moved partial image).

Preferably, all of the above pixel data and the coordinate data are stored in the predetermined order, e.g., the order represented by the coordinate data. A set of the pixel data and a set of the coordinate data are individually compressed, and the compressed pixel data and compressed coordinate data are combined to be stored.

In this way, in a case where a part of an image is extracted and is moved, the image data representing these images (the extracted partial image and the original image exclusive of the extracted partial image) are saved in a state that the positional relationship of these images is kept. It is possible to handle or treat a plurality of images which are separated from each other with maintaining the mutual positional relationship therebetween.

An image synthesizing system according to the third invention comprises a client computer and an image synthesizer which can communicate data to each other.

The client computer comprises an image synthesizing device for inlaying a user image or a portion thereof, in a position defined by mask information accompanying a template image, on the template image representing the background of the user image, and a composite image information transmitting device for transmitting composite image data representing a composite image produced by the image synthesizing device and the mask information used for the synthesis, upon correlating with each other, to the image synthesizer.

The image synthesizer comprises a composite image information receiving device for receiving the composite image data and the mask information which have been transmitted from the client computer, and an image data separating device for separating at least one of image data representing the template image and image data representing the user image from the composite image data representing the composite image, on the basis of the received mask information.

The third invention also provides a method suitable for the image synthesizing system. That is, the method is an image synthesizing method in the image synthesizing system comprising the client computer and the image synthesizer which can communicate data to each other.

In the client computer, a user image or a part thereof is inlaid in a position defined by mask information accompanying a template image, on the template image representing the background of the user image, and the composite image data representing a composite image obtained by inlaying the user image in the template image and the mask information used for inlaying are correlated with each other and are transmitted from the client computer to the image synthesizer.

In the image synthesizer, the composite image data and the mask information which are transmitted from the client computer are received, and at least one of image data representing the template image and image data representing the user image, which constitute the composite image data representing the composite image are separated, from the composite image data on the basis of the received mask information.

According to the third invention, the user image is inlaid in the position defined by the mask information representing the position, in which the user image is to be inlaid, on the template image to produce the composite image in the client computer. The composite image data representing the composite image and the corresponding mask information are correlated with each other, and are transmitted from the client computer to the image synthesizer.

In the image synthesizer, the composite image data and the mask information, which have been transmitted from the client computer, are received. The position, in which the user image is to be inlaid, on the template image is recognized on the basis of the received mask information. Since the position in which the user image is inlaid is found, the template image data and the user image data can be relatively easily separated from the composite image data.

Since the template image data and the user image data, which constitute the composite image data, are separately obtained, the template image data and the user image data can be separately and individually subjected to color conversion, as required. It is possible to perform the most suitable color conversion for the template image data and the most suitable color conversion for the user image.

The composite image is produced again from the template image data and the user image data at least one of which has been subjected to the color conversion, as required. A re-composite image thus obtained by the resynthesis is printed in a printer. Since at least one of the template image and the user image, which constitute the re-composite image, is individually subjected to the color conversion, the re-composite image whose colors have been converted to proper colors is printed in the printer.

The foregoing and other object, features, aspects and advantages of the present invention will become more apparent from the following detailed description of the present invention when taken in conjunction with the accompanying drawings.

DESCRIPTION OF THE PREFERRED EMBODIMENTS

(1) First Embodiment

Figure 1:
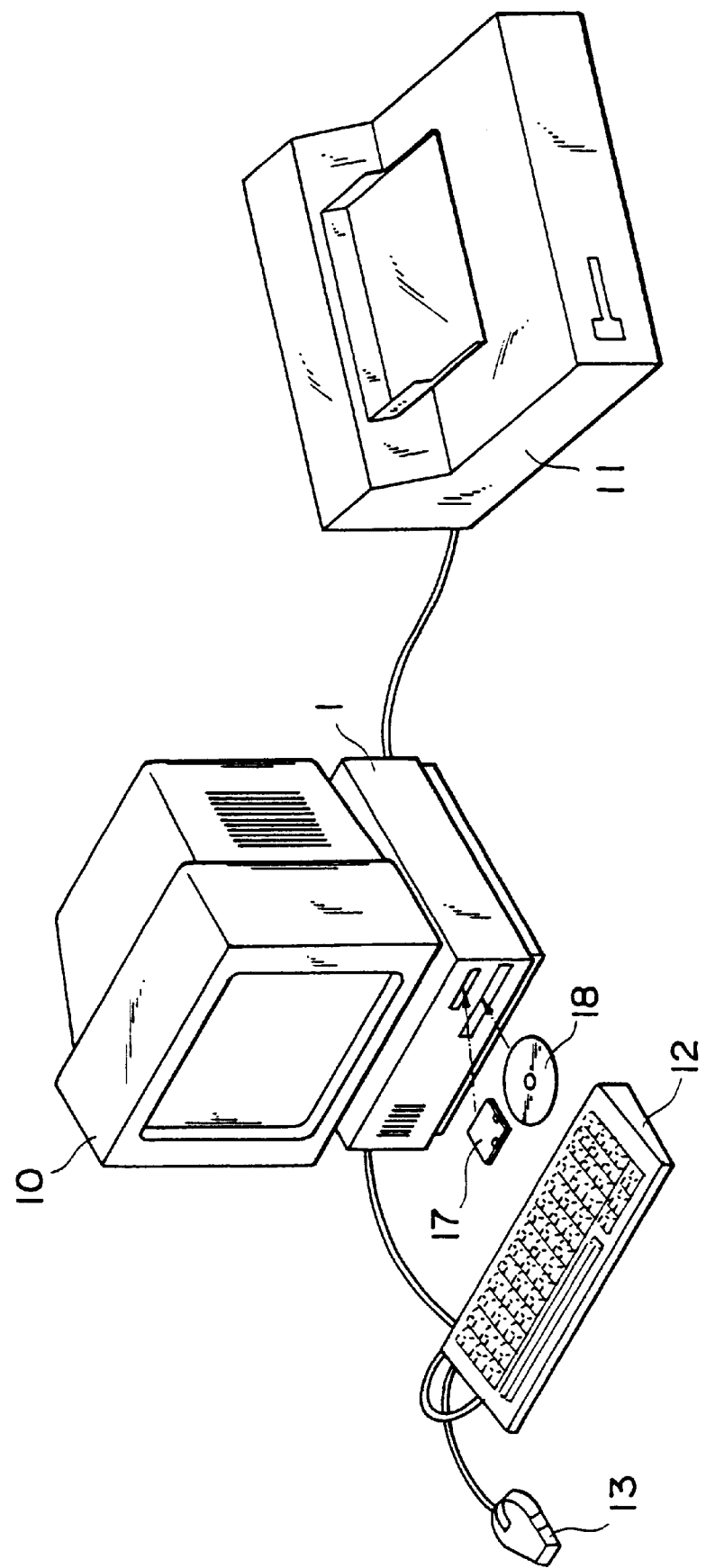
FIG. 1 illustrates the appearance of an image recording/reproducing apparatus.
Figure 2:
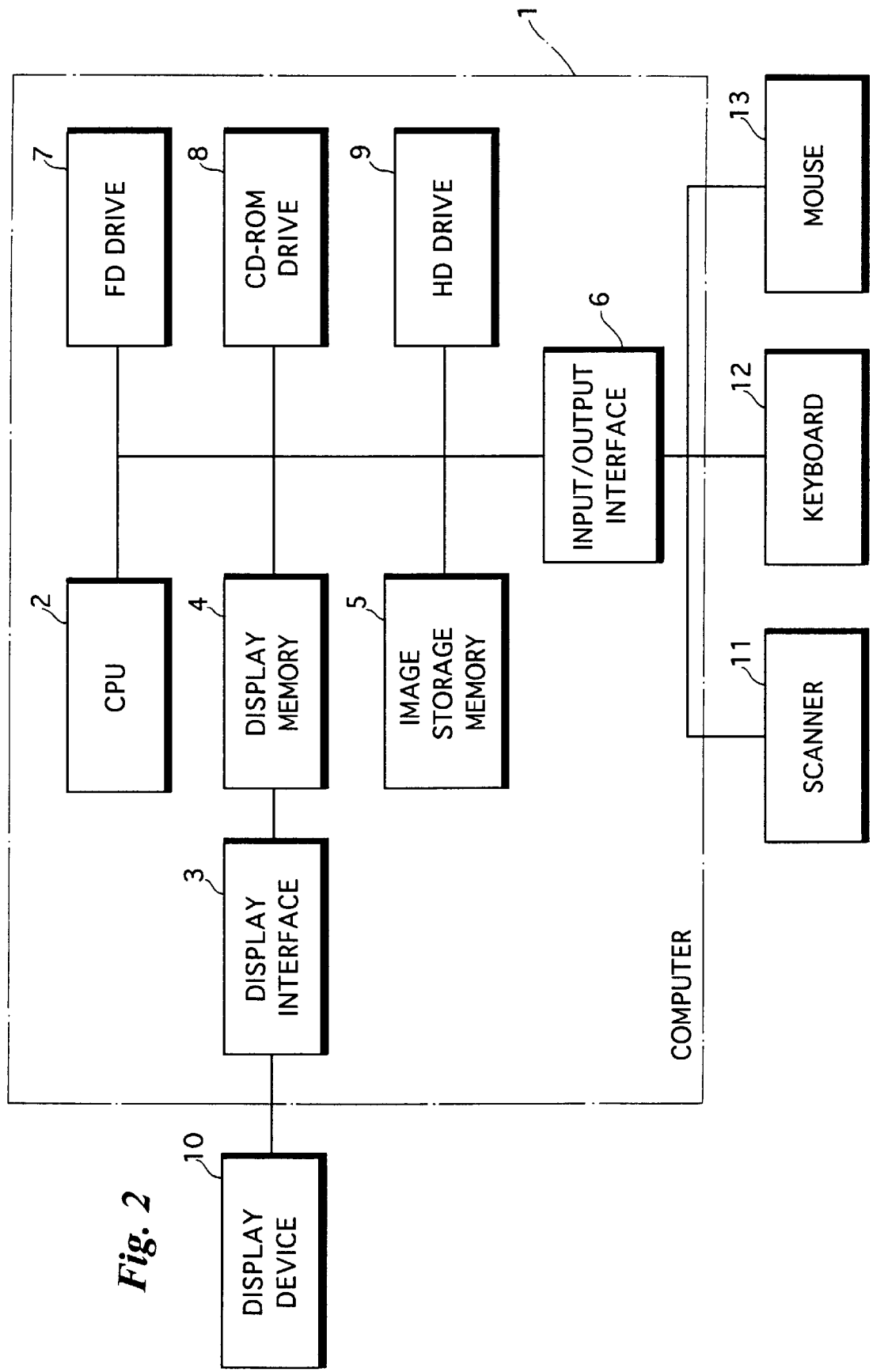
FIG. 2 illustrates the outline of the electrical configuration of the image recording/reproducing apparatus.

FIG. 1 illustrates the appearance of an image processing (recording/reproducing) apparatus according to the present embodiment. FIG. 2 is a block diagram showing the electrical configuration of the image processing (recording/reproducing) apparatus.

With reference to these figures, the image processing (recording/reproducing) apparatus comprises a computer 1. A CRT display device 10, an image scanner 11, a keyboard 12 and a mouse 13 are connected to the computer 1.

The whole of image (recording and reproducing) processing is supervised by a CPU 2 of the computer 1. An FD (floppy disk) drive 7, a CD-ROM (compact disk read only memory) drive 8 and an HD (hard disk) drive 9 are provided inside the computer 1. The FD drive 7 writes data to an FD 17 and reads out data from the FD 17. The CD-ROM drive 8 reads out data and programs from a CD-ROM 18. The HD drive 9 writes data to a hard disk (not shown) and reads out data from the hard disk. Programs making the computer 1 perform various processing (FIGS. 16, 17, 18 and 19) is read out of the CD-ROM 18 and installed in the hard disk.

The scanner 11, the keyboard 12 and the mouse 13 are connected to the computer 1 by an input/output interface 6. The computer 1 further comprises an image storage memory 5 for temporarily storing image data when an image is extracted and a display memory 4 for temporarily storing the image data when the image is displayed on the display device 10. The image data stored in the display memory 4 is read out, and is fed to the display device 10 through a display interface 3, so that the image is displayed.

The image processing (recording/reproducing) apparatus displays a desired image (an original image) on the display device 10, extracts a part of the image (a partial image) from the original image displayed on a screen of the display device 10, edits the extracted partial image, and records on the FD 17 image data representing the edited image. The image data representing the partial image extracted from the original image may be recorded on the FD 17, as required.

Figure 16:
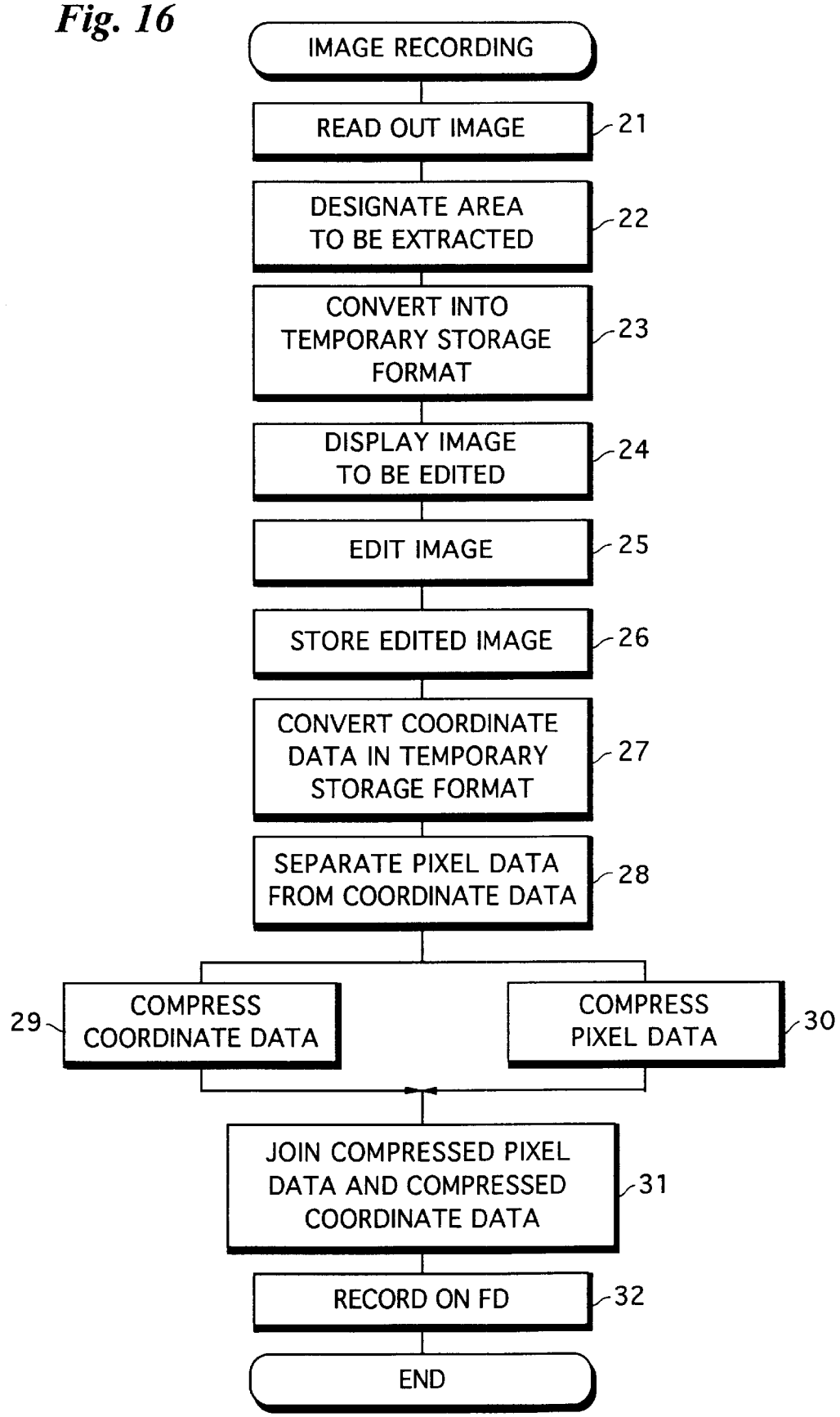
FIG. 16 is a flow chart showing the procedure for recording processing of an edited image.

With reference to examples of display images of the display device 10 shown in FIG. 3 to 10, processing in the image processing apparatus is explained in accordance with a flowchart shown in FIG. 16.

Image data representing one or a plurality of original images are stored in the FD 17, the CD-ROM 18 or the hard disk in advance. Image data which represent a desired original image is read out from one of above storage media by the FD drive 7, the CD-ROM drive 8 or the HD drive 9 (step 21). The image data read out is temporarily stored in the display memory 4. The original image represented by the image data stored in the display memory 4 is displayed on a display screen of the display device 10 as shown in FIG. 3.

Figure 3:
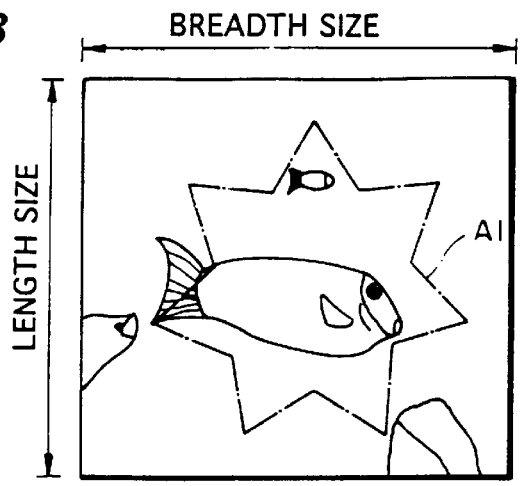
FIGS. 3 to 10 illustrate examples of display images.

It should be understood that FIG. 3 shows the original image displayed on a part of the display screen of the display device 10. Generally an window appears on the display screen and the original image is displayed within the window. In this case, the rectangular frame within which the original image appears shown in FIG. 3 represents a contour of the window.

The original image may be an image appearing on a film, a photograph and other visible media. In this case, the original image on the visible medium is read by the scanner 11, and the original image is displayed using the image data obtained by the scanner 11.

An image area Al to be extracted (cut out) is designated using the mouse 13 by a user in a state where the original image is displayed on the display screen of the display device 10 (step 22). That is, the contour of the image area Al to be extracted (cut out) is drawn by moving a cursor displayed on the screen using the mouse 13. The drawn contour is memorized in the display memory 4 in the form of contour image data (the image data representing the contour is overwritten).

Figure 4:
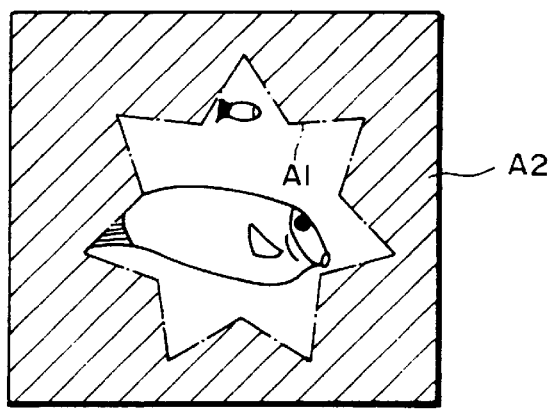

In the display memory 4, the image data of pixels which reside outside the contour (within the window, of course) on the image are replaced with image data representing a specified color (the image data representing the specified color are overwritten). Preferably, the specified color is a color which does not exist in a nature image (a picture of a scene) or a color probability of which is very low (for example, a color the primary color (R, G, B) data of which are represented by such data as FF, FE, 00, 01 or combination thereof). In this way, the color of an image area A2 (of course, the area A2 is limited within the window) outside the image area A1 to be extracted which has been designated using mouse 13 is changed into the predetermined and specified (particular) color as shown in FIG. 4. In this drawing, the image area A2 the color of which has been changed into the specified color is hatched for easy understanding.

Figure 5:
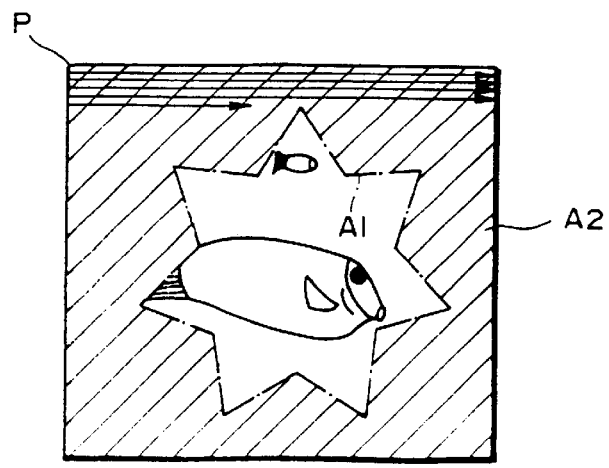

The image data within the window are scanned on the display memory 4 as shown in FIG. 5, and the image data residing within the area A1 to be extracted are read out of the display memory 4. The read-out image data are temporarily stored in the hard disk in accordance with a predetermined temporary storage format in such form that pixel data (image data representing individual pixel is referred to as the "pixel data") and data representing a coordinate position (coordinate data) of the pixel are correlated with each other (step 23). Since the image data of the area A2 outside the area A1 to be extracted are the data representing the specified color as described above, the image data within the area A1 can be read out by discriminating whether the data is one other than the data representing the specified color. The coordinate of the pixel data is determined with a specified point P of the window (e.g. left upper corner) serving as an origin. The coordinate data and the address of the display memory 4 are related to each other in one-to-one correspondence.

Figure 11:
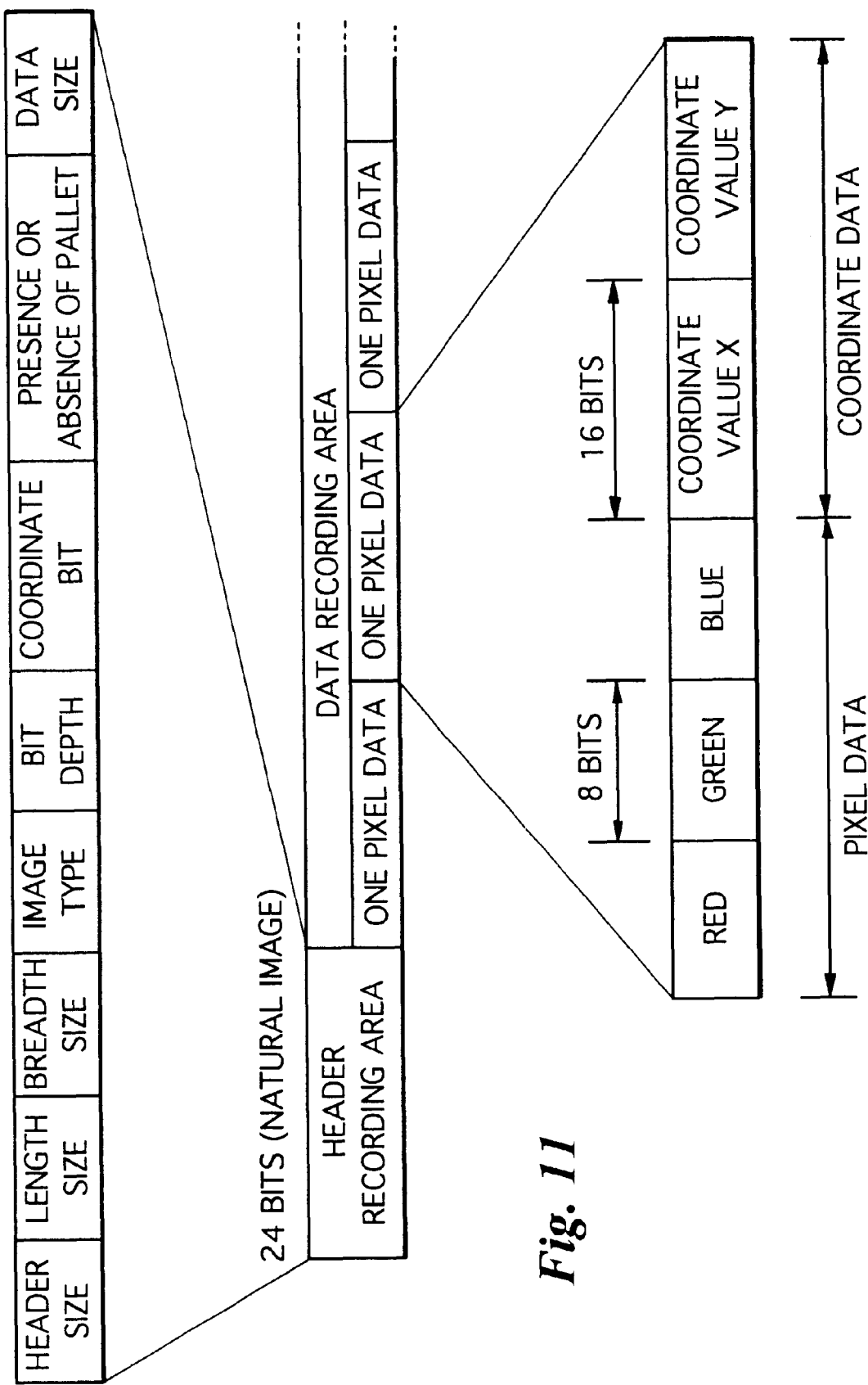
FIG. 11 illustrates an example of a temporary storage format for a natural image.

FIG. 11 shows an example of the temporary storage format, which is for the natural image (scene) represented by 24 bits image data. The temporary storage format includes a header recording area and a data recording area.

The header recording area includes a header size representing the amount of data recorded on a header, a length size and a breadth size respectively representing the length and the breadth of the original image (see FIG. 3), an image type indicating which of a color image and a monochrome image is the image, a bit depth indicating how many bits compose respective R, G and B data of pixel data, a coordinate bit depth indicating how many bits compose coordinate data, presence or absence of a color palette, and a data size representing the amount of data recorded on the data recording area.

Data relating to each pixel is arranged in the order of above scanning in the data recording area. The data relating to each pixel comprises the pixel data which is the image data for each pixel and the coordinate data which indicates the position of the pixel in the original image. In the data relating to each pixel, the pixel data is followed by the coordinate data so as to relate the pixel data and the coordinate data with each other. The pixel data comprises R (red), G (green) and B (blue) data, which are arranged in this order and each of which is composed of eight bits. Therefore, approximately 16,000,000 (=256×256×256) colors can be represented, so that a picture of a scene (natural image) can be expressed. The coordinate data comprises the X coordinate data and the Y coordinate data, which are arranged in this order. The X coordinate data and the Y coordinate data are respectively composed of 16 bits.

In the temporary storage format described above, each of the pixel data uses a total of 24 bits for R, G, and B. The amount of the pixel data can be reduced using a color palette. A temporary storage format for the color palette (pseudo picture) is illustrated in FIG. 12.

Figure 12:
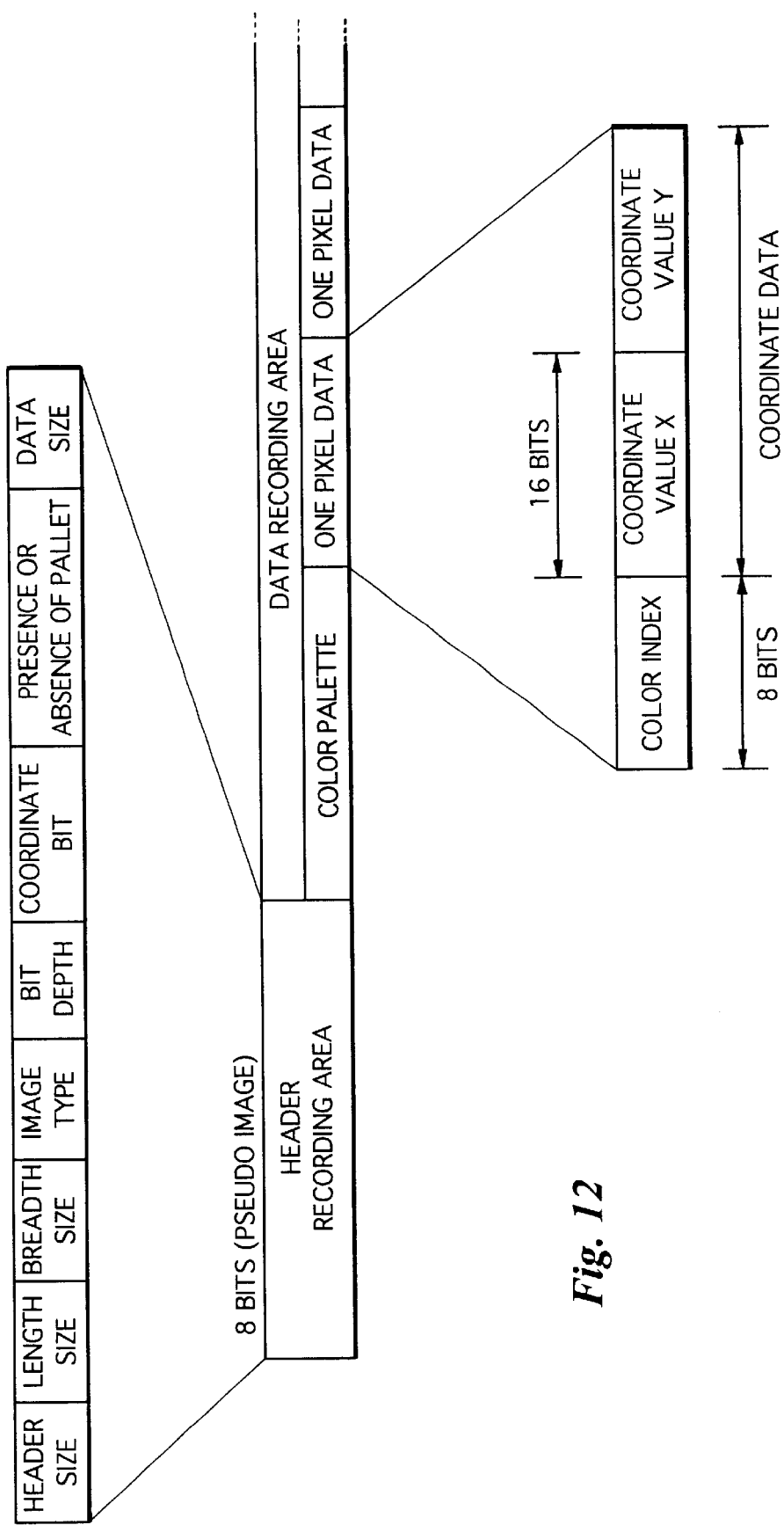
FIG. 12 illustrates an example of a temporary storage format for a pseudo image.

The header recording area of the format shown in FIG. 12 is the same as that of the format of FIG. 11. The data recording area includes therein a color palette recording area in which image data representing 256 types of color are recorded. The data relating to each pixel and recorded in the data recording area includes a color index, the X coordinate data and Y coordinate data which are recorded in this order. The color index designates one of 256 colors in the color palette.

Figure 6:
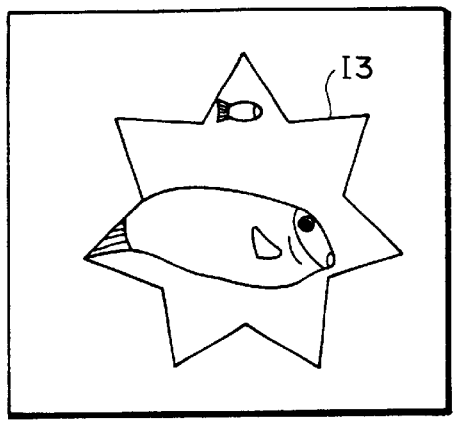

With reference to FIG. 16 again, the pixel data and the coordinate data which have been temporarily stored in the hard disk in accordance with the temporary storage format are read out, and an image to be edited I3 is displayed, as shown in FIG. 6, on the display screen of the display device 10 on the basis of the pixel data and the coordinate data which have been read out (by the pixel data which have been written into the display memory 4, in accordance with the coordinate data) (step 24). The image I3 is the same as the image A1 which has been extracted and is displayed such that the image I3 appears in the window. The details of the display processing of the image to be edited I3 will be described later.

When the image to be edited I3 is displayed on the display screen, image editing processing (further extraction of another partial image from the image I3 and movement of the extracted partial image) is performed by the user (step 25). The details of the image editing processing will be also described later.

Figure 9:
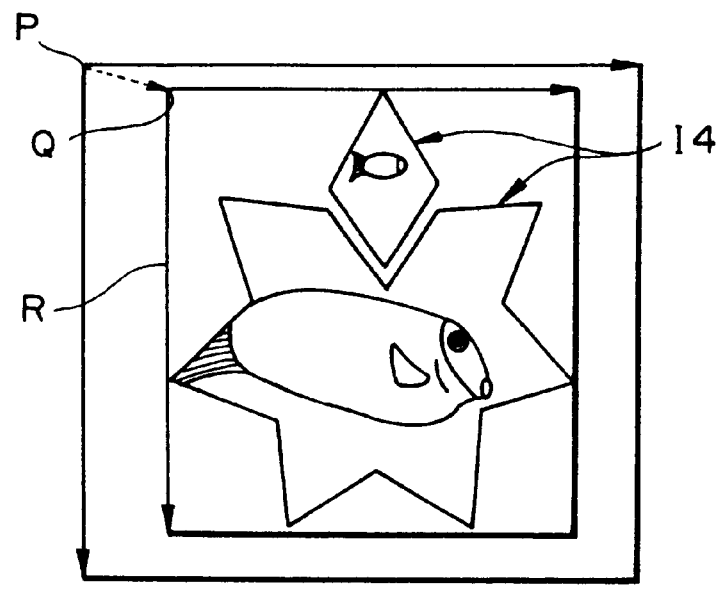
Figure 10:
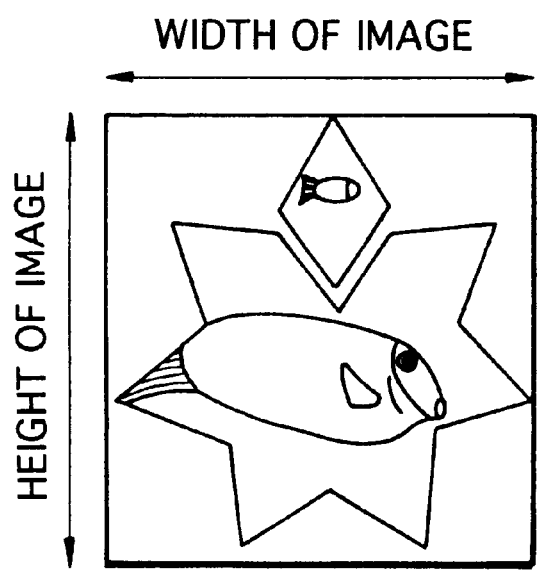

The edited image I4 is shown in FIG. 9. When the image editing processing is terminated, image data representing an edited image I4 are temporarily stored in the hard disk in accordance with the temporary storage format described above (step 26). The coordinate data stored in the hard disk in accordance with the temporary storage format are read out, and a coordinate conversion of the coordinate data is performed (step 27, see FIGS. 9 and 10). The image the coordinate data of which have been converted is shown in FIG. 10.

The coordinate conversion is performed as follows: A rectangle R circumscribing the edited image I4 is assumed. The assumed rectangle R is not displayed on the screen. An appropriate point Q on the rectangle R (for example, a point of left and upper corner) is selected to be an origin of a new coordinate system. The coordinate conversion from the XY coordinate system with the point P serving as the origin to the new XY coordinate system with the origin Q is performed for each of the pixels composing the edited image I4. The converted coordinate data are stored again in the hard disk in accordance with the temporary storage format upon being correlated with the pixel data.

When the coordinate data conversion is completed, the pixel data and the coordinate data corresponding to the pixel data are separated from each other (step 28). That is, all the pixel data of the edited image I4 are gathered and are arranged in the order of the scanning (the same as the order in the temporary storage format), and all the coordinate data are also gathered to be arranged in the same order as that of the pixel data. A set of the pixel data and a set of the coordinate data are produced.

The set of the pixel data is subjected to data compression, e.g., Huffman compression (step 30).

The set of the coordinate data is subjected to increment length compression (step 29). The increment length compression includes a two-dimension to one-dimension conversion processing of the two-dimensional coordinate data (X, Y), and a data compression processing of the one-dimensional coordinate data.

The two/one dimension conversion processing is performed through the following equation;

(one-dimensional coordinate value)=(Y coordinate value)×(width of image)+(X coordinate value).

The width of image is the width of the assumed rectangle R as shown in FIG. 10.

The data compression processing of the one-dimensional coordinate data (values) comprises a grouping (or clustering) processing for creating a plurality of groups (or clusters) of coordinate values (data) from among the set of the coordinate values which are arranged in descending order, while separating at the discontinuous points of the coordinate values (each group comprises a subset of continuos coordinate values; the number of the coordinate values included in each group is referred to as "increment length"), the produced groups being arranged in the order of the coordinate values belonging to the groups; a difference calculation processing for calculating the difference between the head (starting) coordinate value of one group and the head (stating) coordinate value of another group which arranged adjacent to said one group; and arranging the head coordinate value of the first (starting) group (one-dimensional head coordinate value), the increment length of the first group, the difference between the head coordinate value of the preceding group and the head coordinate value of the succeeding group (difference between one-dimensional head coordinate values), and the increment length of the succeeding group in this order.

For example, assume that the one-dimensional coordinate values which are arranged in descending order are "24, 25, 26, 27, 28, 128, 129, 130, 131, 156, 157, 158, 159", for example. Four coordinate values are continuous from "24" to "28" in the first group (exclusive of the head value), three coordinate values are continuous from "128" to "131" in the second group (exclusive of the head value), and three coordinate values are continuous from "156" to "159" in the third group (exclusive of the head value). The "difference between one-dimensional head coordinate value" between the first group and the second group, and between the second group and the third group are 128−24=104 and 156−128=28, respectively. The data obtained by the increment length compression is "24, 4, 104, 3, 28, 3".

Figure 13:
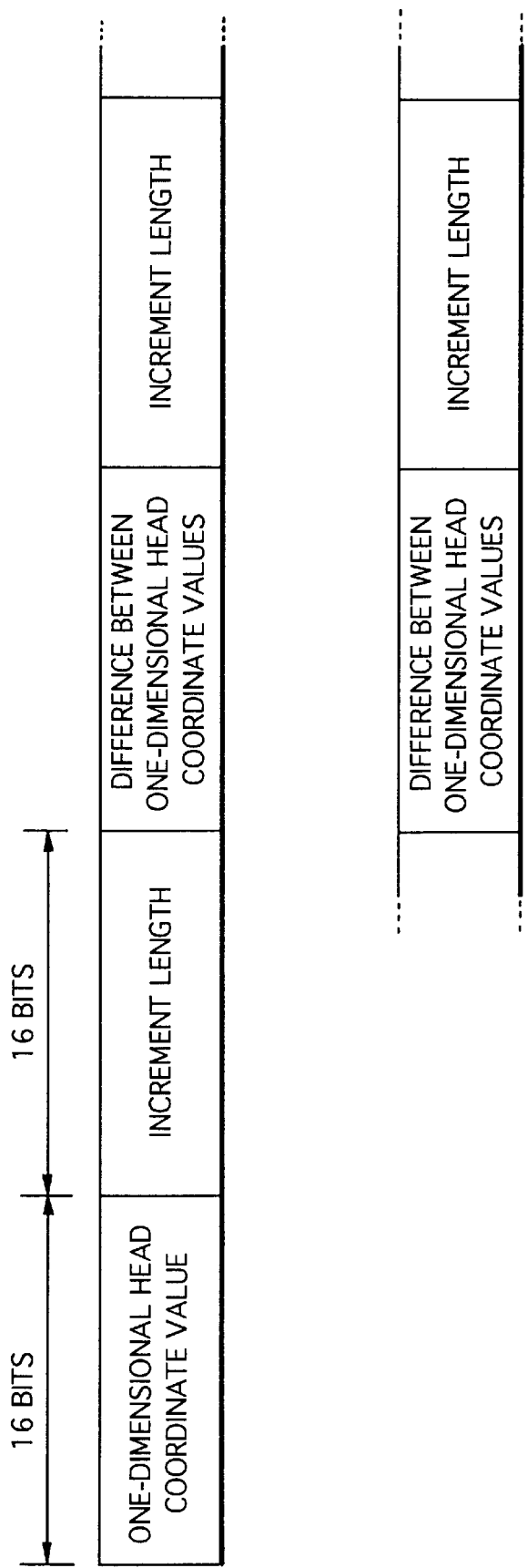
FIG. 13 illustrates the format of coordinate data which has been subjected to increment length compression.

FIG. 13 shows a format of the increment length compression result data. First, the "one-dimensional head coordinate value" and the "increment length" of the first group are arranged in this order. Next, the "difference between one-dimensional head coordinate values" between the first group and the second group and the "increment length" of the second group are arranged in this order. In the similar manner, the "difference between one-dimensional head coordinate values" between the preceding group and the succeeding group and the "increment length" of the succeeding group are repeatedly arranged.

The pixel data, which has been subjected to Huffman compression, and the coordinate data, which has been subjected to increment length compression, are connected to each other (step 31) i.e., they are arranged such that the compressed pixel data is followed by the compressed coordinate data. The pixel data and the coordinate data, which have been connected to each other, are recorded on the FD 17 in accordance with the format shown in FIG. 14 or 15 (step 32).

Figure 14:
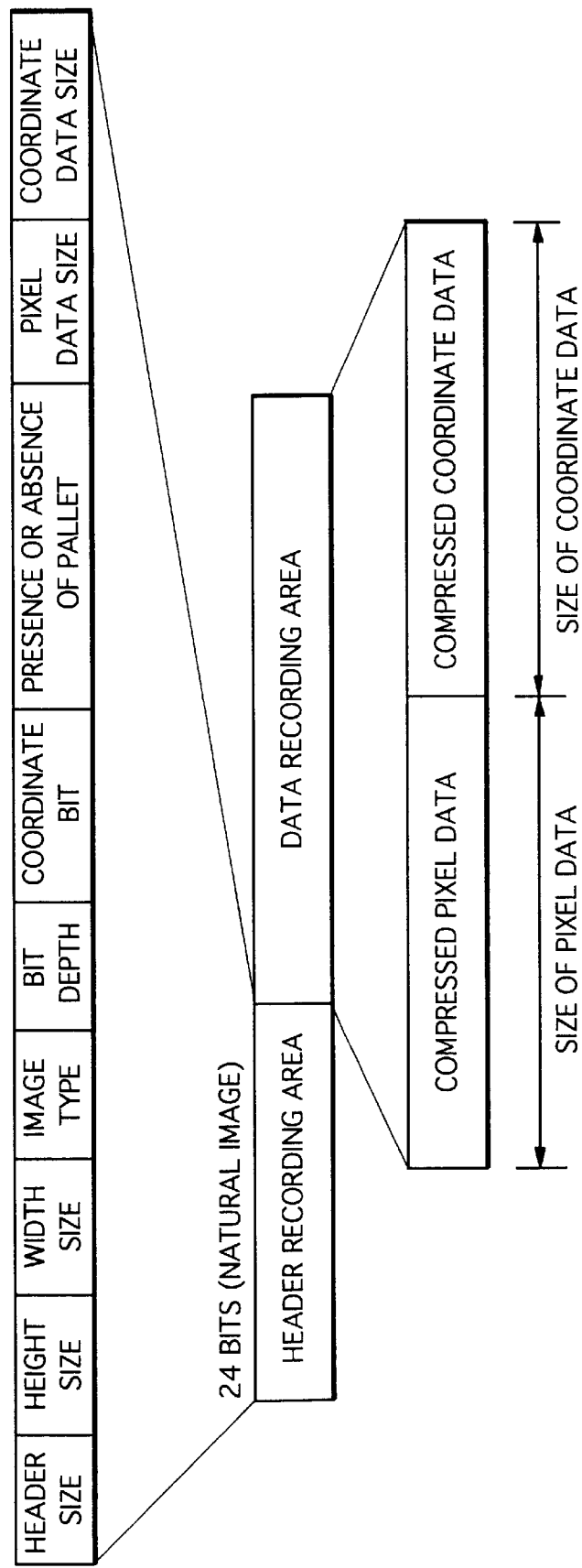
FIG. 14 illustrates a format for recording compressed pixel data and coordinate data for a natural image.
Figure 15:
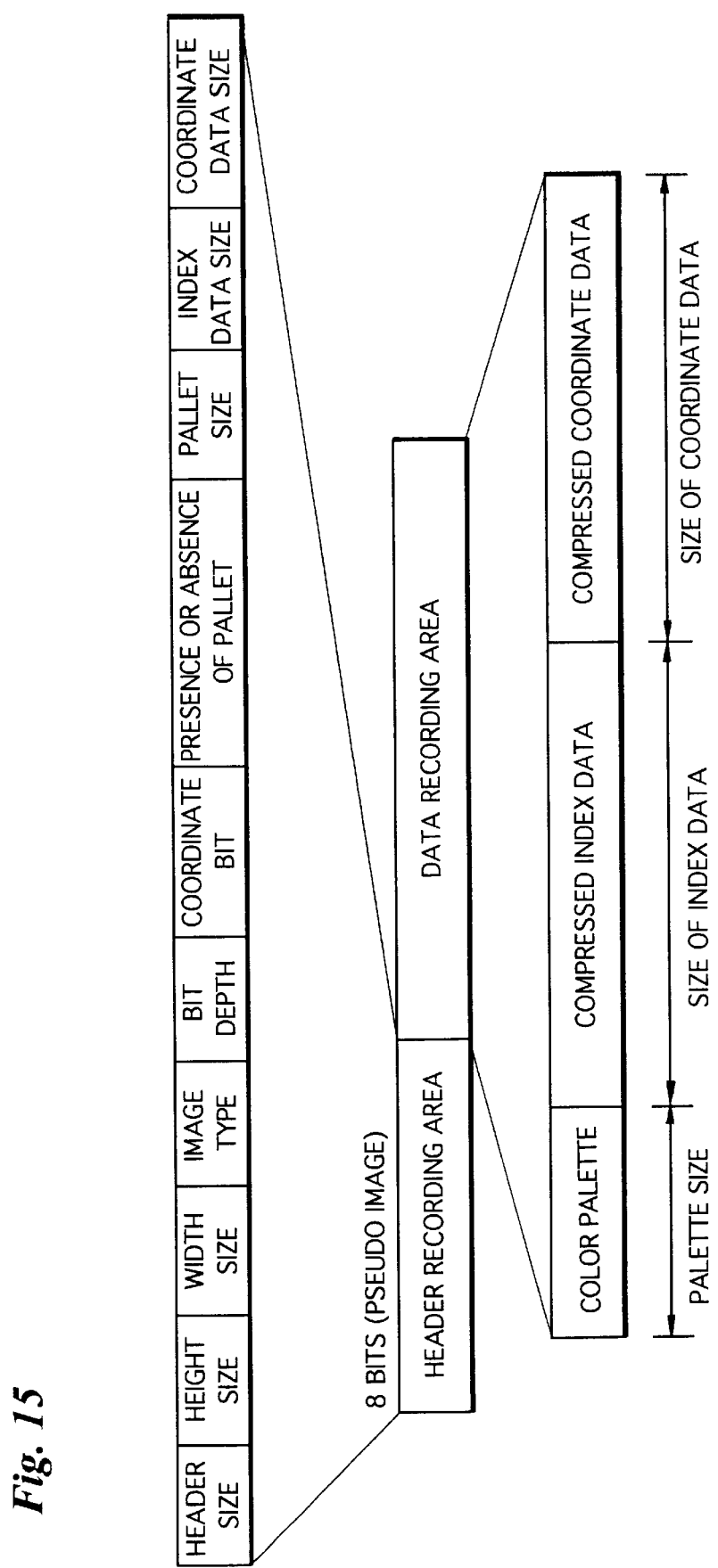
FIG. 15 illustrates a format for recording compressed pixel data and coordinate data for a pseudo image.

FIG. 14 shows a compressed data format for the image data of a natural image (a picture of a scene). The header recording area are basically the same as that shown in FIG. 11, except that the length size and the breadth size are replaced with the height size and the width size, respectively, and that the data size is replaced with the pixel data size and the coordinate date size. The data recording area has the compressed pixel data and the compressed coordinate data arranged and stored therein in this order. FIG. 15 shows a compressed data format for the image data of the pseudo image. The header recording area is almost the same as that shown in FIG. 14, except that the pixel data size is replaced with the index data size. The data recording area includes the color palette, the compressed index data and the compressed coordinate data arranged in this order.

Figure 17:
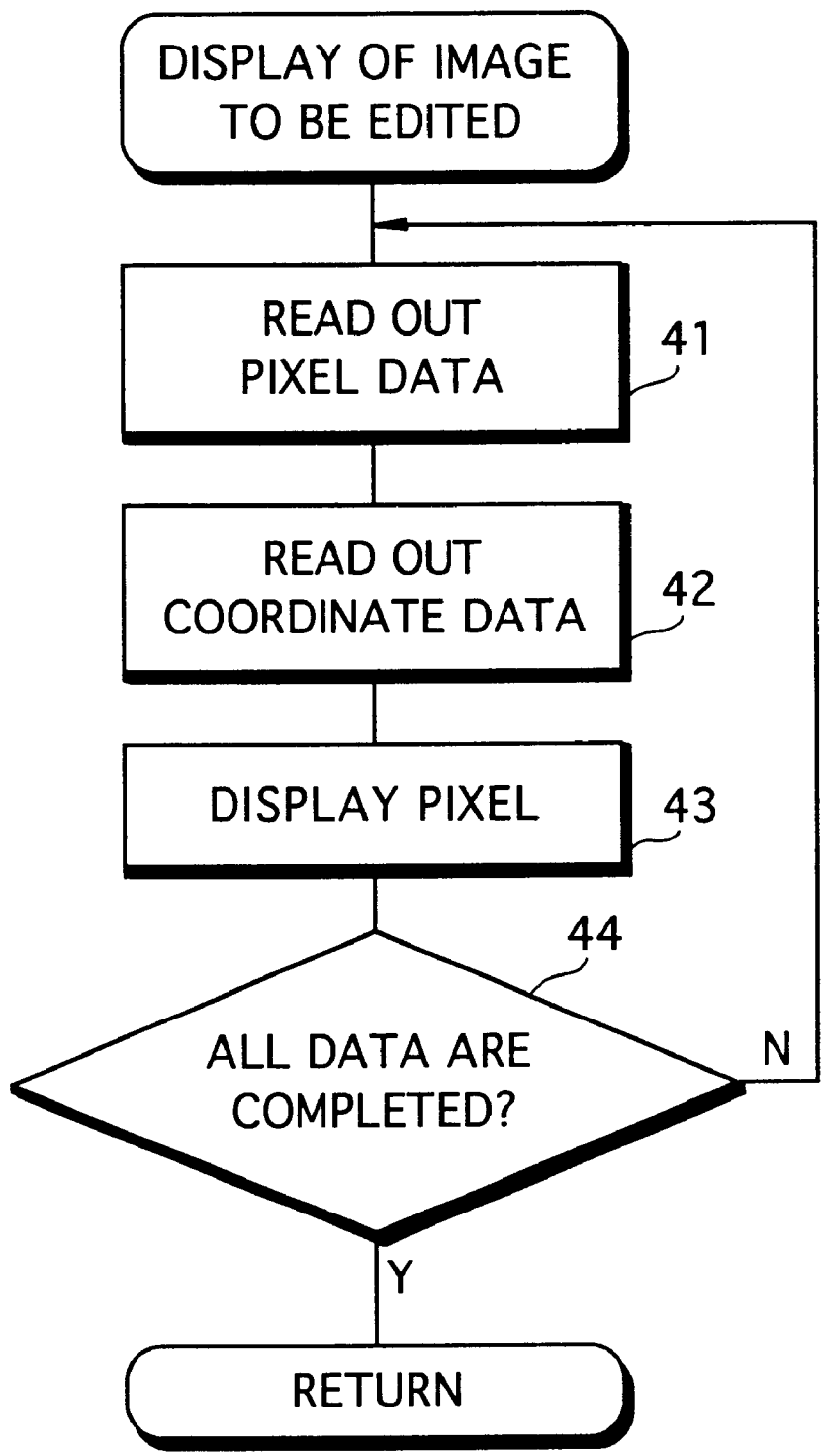
FIG. 17 shows the procedure for image display processing.

Referring to FIG. 17, description is made of processing (FIG. 16, step 24) for displaying an image to be edited.

Pixel data and coordinate data which have been converted into a temporary storage format are read out from the hard disk (steps 41 and 42), a pixel represented by the pixel data is displayed at a position designated by the coordinate data by writing the pixel data into the display memory 4 in accordance with the coordinate data (step 43). The processing of steps 41 to 43 are repeatedly executed for the all pixel data representing the image (step 44). Consequently, the image extracted by the user is displayed on the display screen of the display device 10, as shown in FIG. 6.

Figure 7:
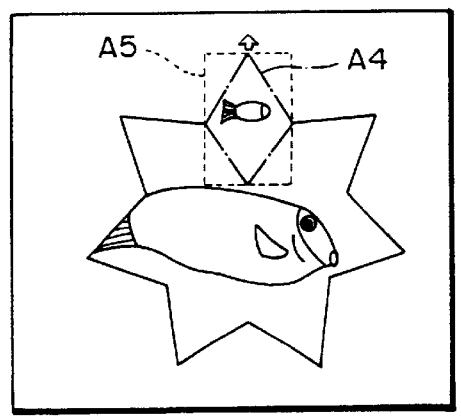
Figure 8:
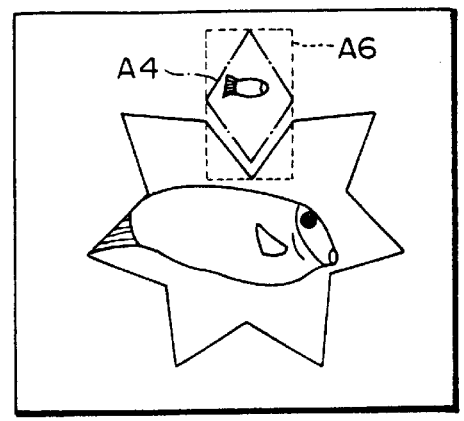
Figure 18:
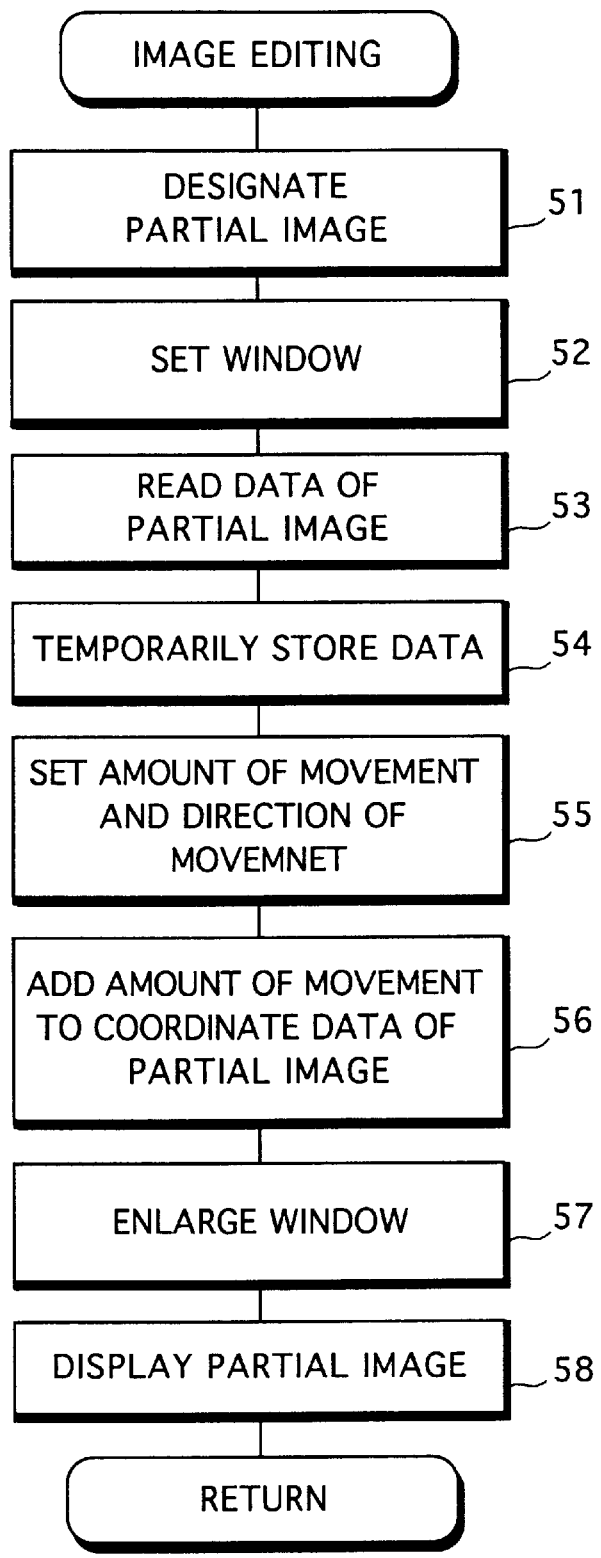
FIG. 18 shows the procedure for image editing processing.

Referring to FIGS. 7, 8 and 18, description is made of image editing processing (FIG. 16, step 25).

The example of the image editing processing described hereinafter is that a part of image (a partial image) is further extracted (cut out) from the displayed image to be edited, and the extracted partial image is moved in an arbitrary direction by an arbitrary distance.

In the image to be edited displayed on the display screen of the display device 10, an area of a partial image A4 to be further extracted from the image is designated by the user using the mouse 13 (step 51). An window A5 circumscribing or surrounding the designated partial image A4 is set for processing (step 52, see FIG. 7).

The pixel data and the coordinate data representing the partial image A4 are read from the hard disk (step 53). The pixel data and the coordinate data, which have been read, are temporarily stored in the image storage memory 5 (step 54).

The amount of movement and the direction of movement of the partial image A4 are set by the user (step 55). For example, a cursor on the display screen is moved in a desired direction by a desired distance using the keyboard 12 or the mouse 13. The amount and the direction of the movement of the cursor is read in the computer 1. The variation Δx and Δy corresponding to the amount and the direction of the movement of the cursor are respectively added to the coordinate values X and Y of the pixels which compose the partial image A4 to obtain new coordinate data (values) for the partial image A4 (step 56).

The window A5 is enlarged such that the window A6 surrounds and circumscribes the moved partial image A4 (step 57). Within the enlarged window A6, the pixel data representing the partial image A4 before movement are erased and the pixel data representing the partial image A4 after movement are overwritten into the display memory 4 in accordance with the new coordinate data. Thus, the partial image A4 after movement is displayed in the display screen (step 58, see FIG. 8).

Figure 19:
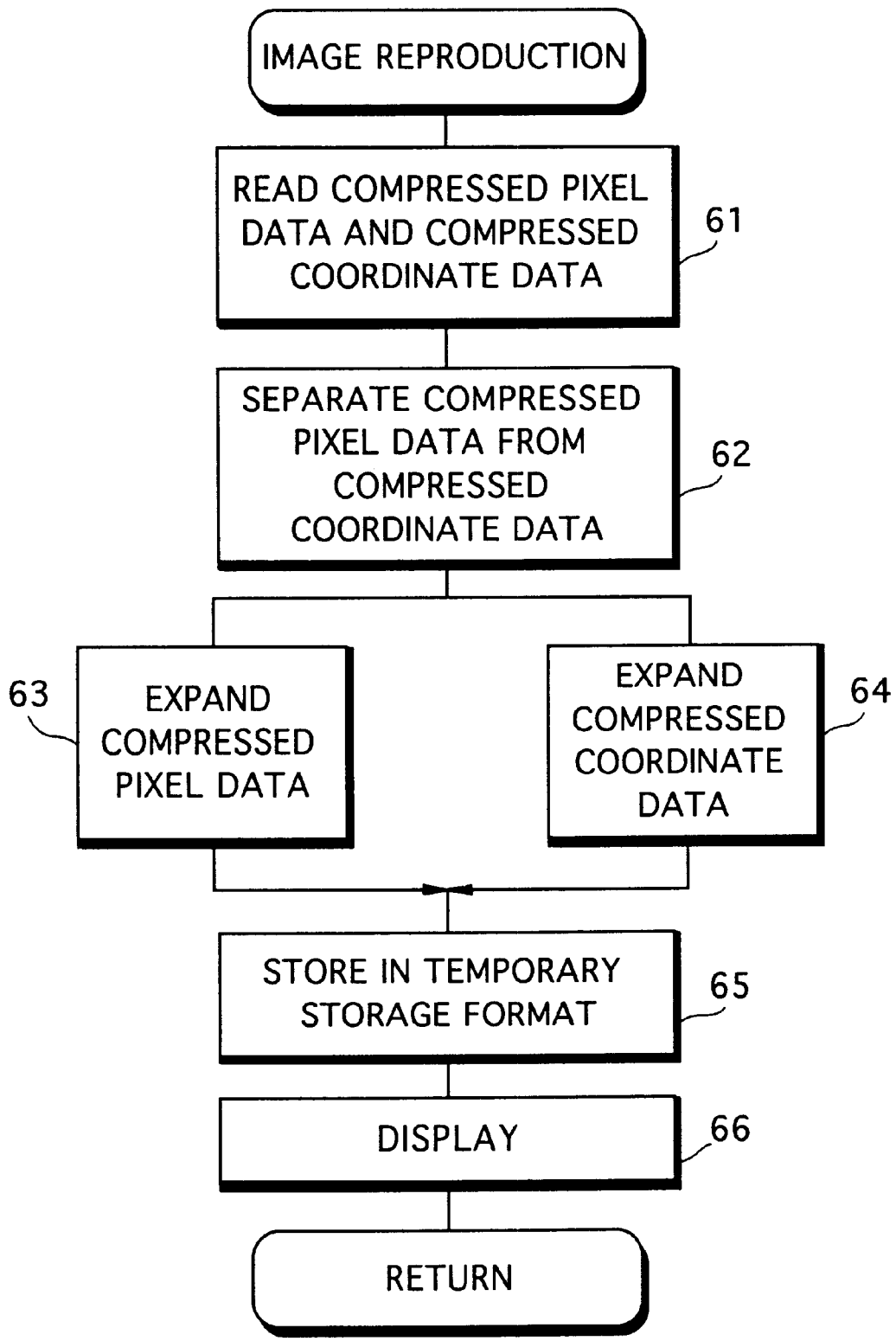
FIG. 19 is a flow chart showing the procedure for image reproduction processing.

FIG. 19 shows the procedure for processing for reproducing an image based on the data which have been recorded on the FD 17 in accordance with the format shown in FIG. 14 or FIG. 15.

The compressed pixel data and the corresponding coordinate data are read out of the FD 17 (step 61), and are separated from each other (step 62).

The compressed pixel data is expanded by being subjected to Huffman decoding (step 63). The compressed coordinate data is first converted into the one-dimensional coordinate data by being subjected to expansion. Further, the one-dimensional coordinate data is converted into the two-dimensional coordinate data (step 64). In this way, the expanded pixel data and the expanded coordinate data are obtained.

The expanded pixel data and the expanded coordinate data are temporarily stored in the hard disk in accordance with the temporary storage format described above (step 65). The pixel data and the coordinate data are read out from the hard disk, and the pixel data are written into the display memory 4 in accordance with the coordinate data, so that the edited image as shown in FIG. 8 or FIG. 10 is displayed on the display device 10 (step 66).

In the above embodiment, the edited image (the pixel data and the coordinate data thereof) is compressed. Of course, the image data before editing (the image data obtained at step 23 of FIG. 16) may be compressed to be stored or recorded. The compressed data may be stored in the hard disk instead of the FD 17.

In the coordinate conversion processing at step 27 of FIG. 16, the appropriate point Q on the rectangle R which circumscribes the partial image I4 is adopted as a coordinate origin. In order to device the coordinate origin, an rectangle which circumscribes a part of the image I4 may be considered. Alternatively, a particular point within the partial image I4 may be adopted as a coordinate origin. The coordinate conversion processing may be executed before the editing processing. The coordinate conversion is not necessarily required.

(2) Second Embodiment

Figure 20:
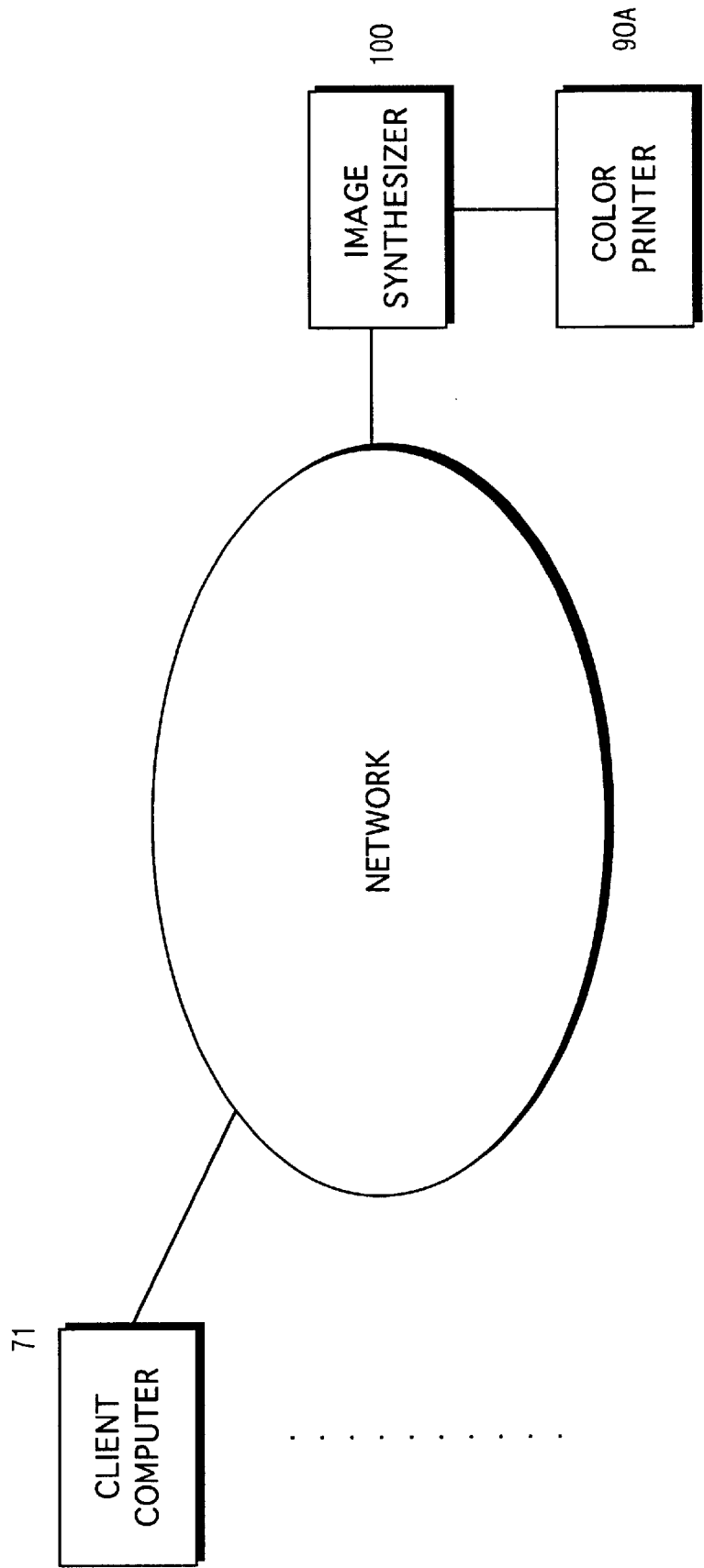
FIG. 20 illustrates the overall configuration of an image synthesizing system.

FIG. 20 illustrates the overall configuration of an image synthesizing system according to the second embodiment.

The image synthesizing system comprises a client computer 71 and an image synthesizer 100 which can communicate image data and other data to each other via a network. A color printer 90A is connected to the image synthesizer 100.

In the image synthesizing system, a user image that a user of the client computer 71 has is inlaid in a template image in the client computer 71, to produce a composite image. The produced composite image and mask information used for producing the composite image and representing a position, in which the user image is to be inlaid, are transmitted from the client computer 71 to the image synthesizer 100. In the image synthesizer 100, the template image and the user image, which constitute the composite image, are separated from each other on the basis of the mask information.

The user image and the template image, which have been separated from each other, can be separately subjected to color conversion (color correction), as required, for example, depending on the characteristics of the color printer 90A. The template image and the user image, at least one of which has been subjected to the color conversion (color correction), are resynthesized, to produce a composite image, so that the obtained final composite image (re-composite image) has proper colors.

Figure 21:
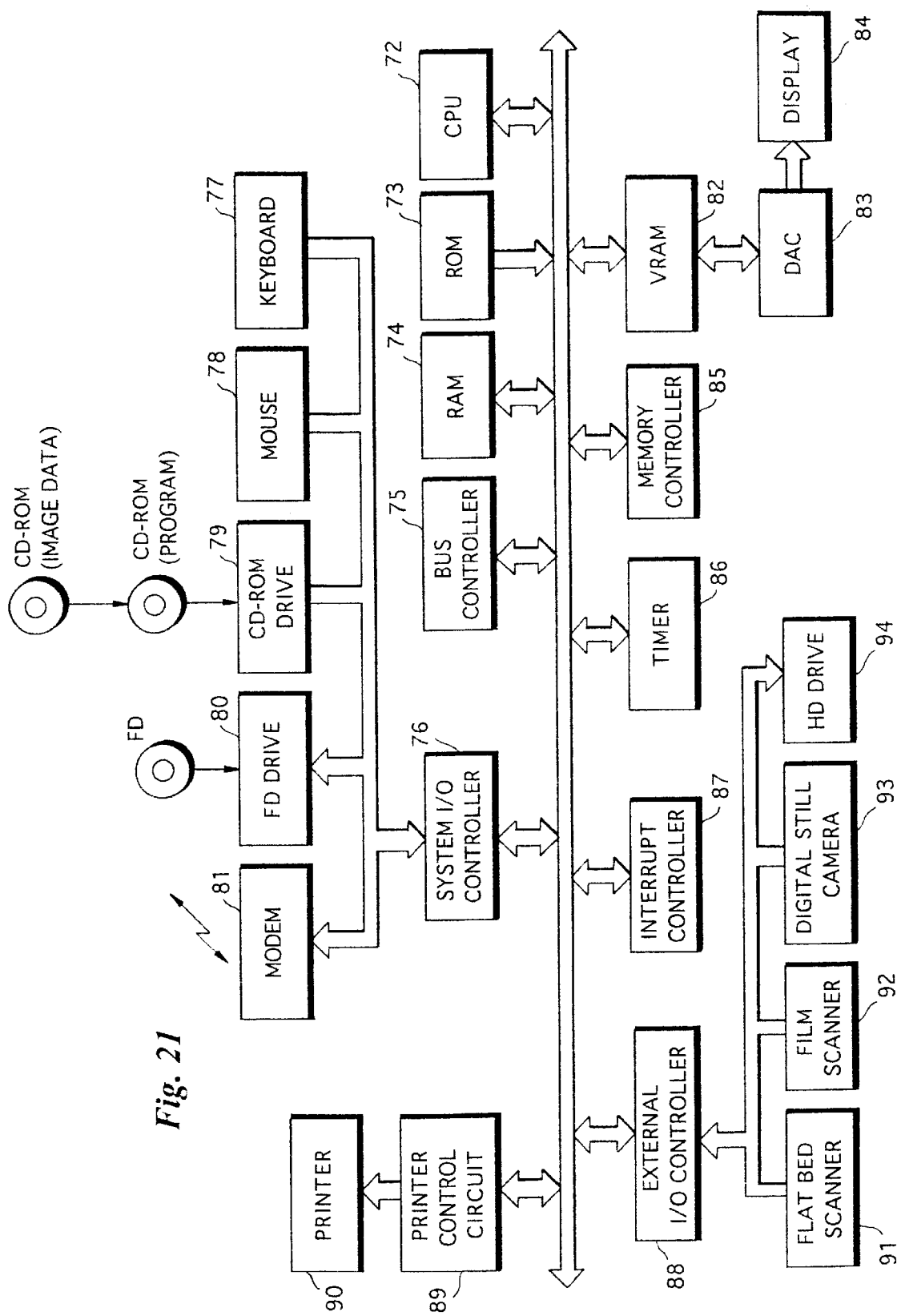
FIG. 21 is a block diagram showing the electrical configuration of a client computer.

FIG. 21 is a block diagram showing the electrical configuration of the client computer 71. The client computer 71 is generally placed in a user's home.

The overall operations of the client computer 71 are supervised by a CPU 72.

The client computer 71 comprises a ROM 73, a RAM 74 for temporarily storing data, a VRAM 82 for temporarily storing data representing an image displayed on a display device 84 so as to edit an image, and a memory controller 85 for controlling the reading of data from the ROM 73 and the writing and reading of data to and from the RAM 74 and the VRAM 82. Image data read out from the VRAM 82 is fed to a digital-to-analog (DA) converter 83, where it is converted into an analog image signal. Consequently, an image is displayed on the display device 84.

A bus controller 75, the memory controller 85, and a timer 86 are connected to the client computer 71.

Furthermore, a system I/O controller 76 is connected to the client computer 71. A keyboard 77 and a mouse 78 for accepting an operation instruction from the user of the client computer 71, a CD-ROM drive 79 and an FD drive 80 for reading image data, and a modem 81 for making connection to the network are connected to the system I/O controller 76.

An external I/O controller 88 is connected to the client computer 71. A flat bet scanner 91, a film scanner 92, a digital still camera 93, and an HD drive 94 are connected to the external I/O controller 88. A program for controlling the client computer 71 is stored in an HD (a hard disk; not shown), to and from which data (inclusive of programs) are read and written by the HD drive 94. (The program is installed in the client computer 71 from the CD-ROM and stored in the HD. A CD-ROM storing the program is loaded in the CD-ROM drive 79 and the program is read by the CD-ROM drive 79.) The program stored in the HD is read out, so that predetermined processing, described later, is performed by the client computer 71.

A printer 90 for printing an image and a printer control circuit 89 for controlling the printer 90 are further connected to the client computer 71.

The user inlays the user image in the template image using the client computer 71.

Figure 22:
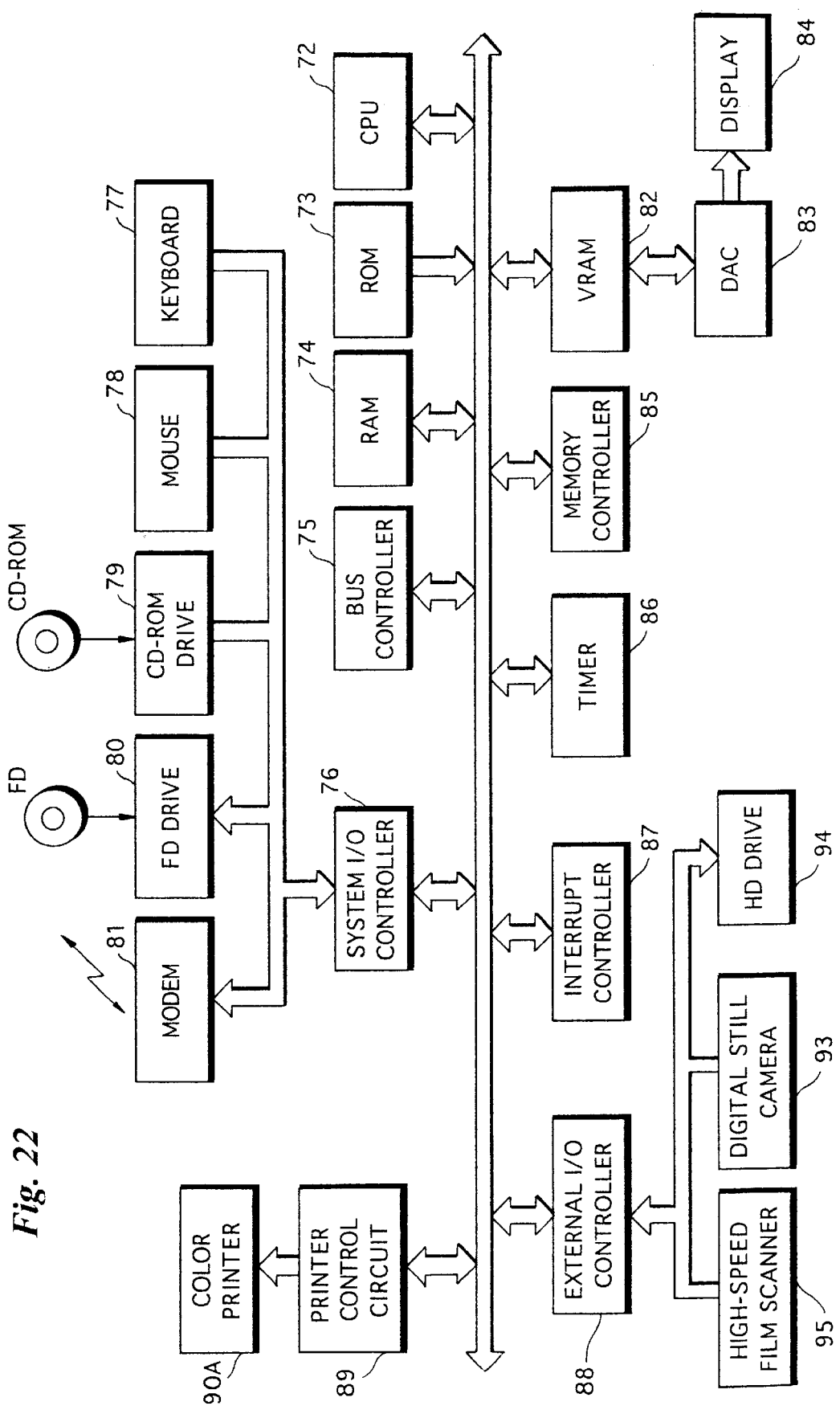
FIG. 22 is a block diagram showing the electrical configuration of an image synthesizer.

FIG. 22 is a block diagram showing the electrical configuration of the image synthesizer 100. A high-quality color printer 90A is provided and connected to the image synthesizer 100. In FIG. 22, the same reference numerals are assigned to the same components as those shown in FIG. 21 and hence, the description thereof is not repeated.

A program for controlling the image synthesizer 100 is also installed in the image synthesizer 100 from the CD-ROM and stored in an HD. A CD-ROM storing the program is loaded in a CD-ROM drive 79 and the program is read by the CD-ROM drive 79.

A high-speed film scanner 95 is connected to an external I/O controller 88 included in the image synthesizer 100. Various image files and holders are stored in the HD, to and from which data are written and read by the HD drive 94 connected to the external I/O controller 88.

In the present embodiment, the user of the client computer 71 has a user image. Examples of the user image are a visible image such as a photograph, a film and so on, and images represented by image data recorded on a memory card, a floppy disk (FD), a compact disk (CD) and the like. In a case where the user image is the photograph, the photograph is read by the flat bed scanner 91 to obtain image data representing the user image. In a case where the user image is the film, the film is read by the film scanner 92 so that image data of the user image is produced. In a case where the user image is represented by the image data recorded in the memory card, the image data is read from the memory card by the digital still camera 93. In a case where the user image is represented by the image data which has been recorded on the FD, the image data representing the user image is read from the FD by the FD drive 80. In a case where the user image data is recorded on the CD-ROM, the image data is read by the CD-ROM drive 79 from the CD-ROM.

Figure 23:
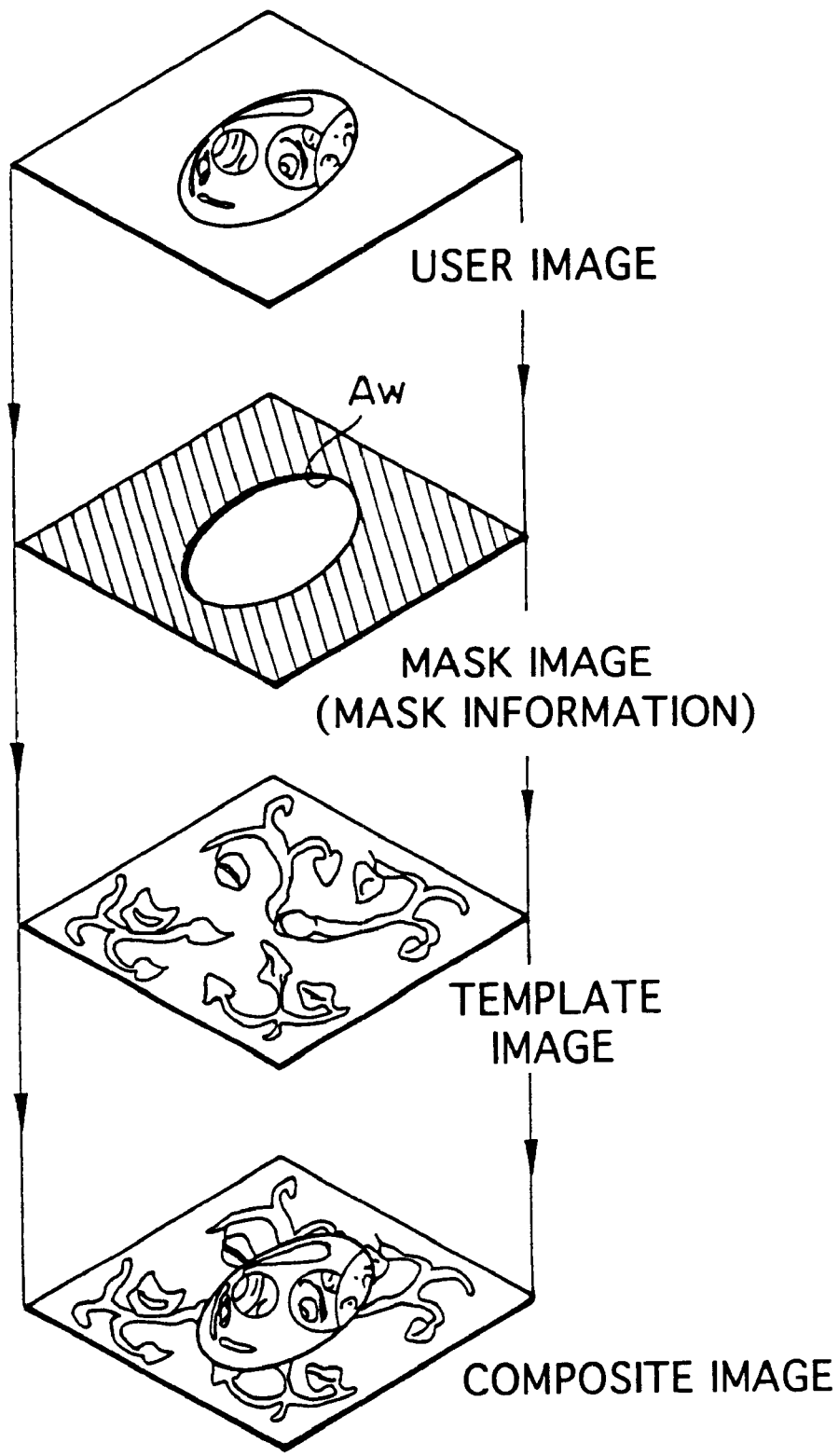
FIG. 23 shows how a composite image is produced.

FIG. 23 is a perspective view showing how a composite image is produced.

A template image is an image representing the background of the user image. A position, in which the user image is to be inlaid, on the template image is defined by a mask image. A window Aw for defining the position, in which the user image is to be inlaid, on the template image is determined in the mask image. The mask image is stored together with the corresponding template image as mask information in the same file, so that the template image and the mask image are correlated with each other.

The template image and the mask image may be produced in the client computer 71 by the user or may be obtained from another computer in which the template image and the mask image are produced. In either case, template image data representing the template image and the mask image data representing the mask image are recorded on the HD.

The image synthesizing processing is performed as follows.

In the mask image, all the pixels within the window Aw is represented by data "1" and all the pixels within the other area (masking area hatched in FIG. 23) than the window Aw is represented by data "0". AND logic between the user image data and the mask image data is operated to extract the part of the user image which just corresponds to the window Aw. NAND logic operation between the mask image data and the template image data results in the template image having a blank area which just corresponds to the window Aw. The composite image is obtained by OR logic between the partial user image corresponding to the window Aw and the template image lacking the data corresponding to the window Aw.

Figure 24:
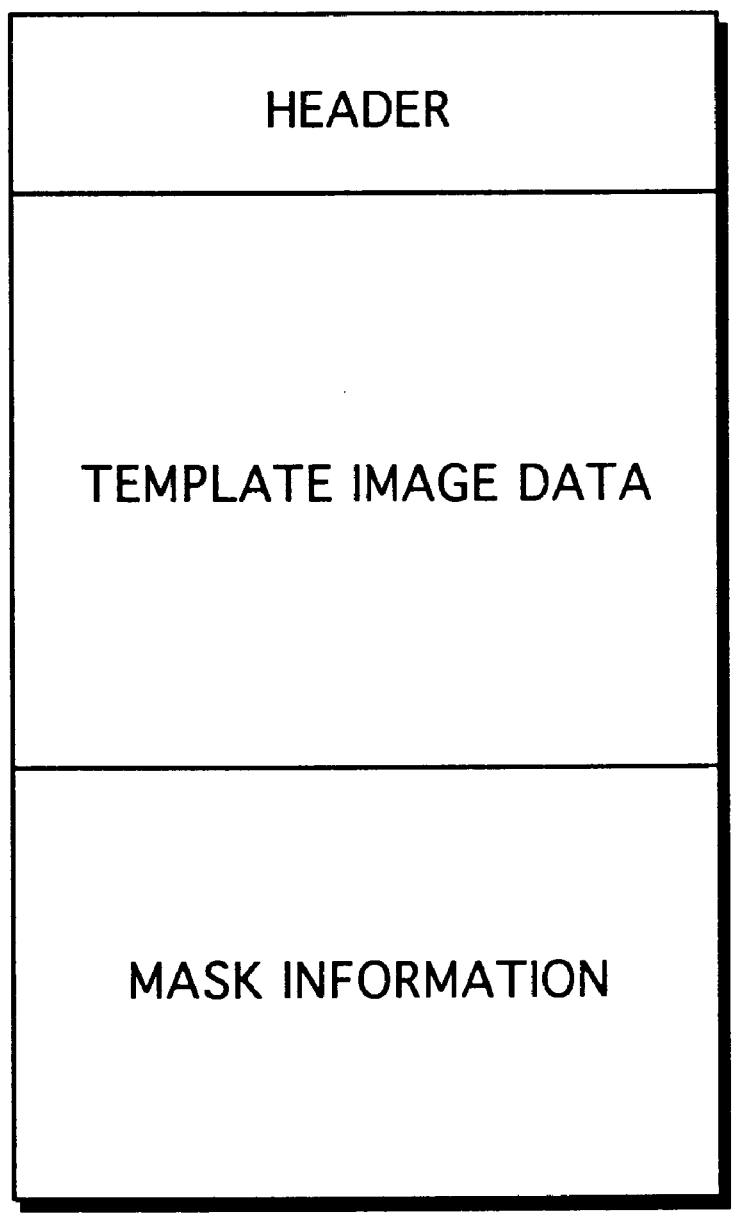
FIG. 24 illustrates the format of a template image file.

FIG. 24 illustrates the format of the template image file.

The template image file stores a header indicating that this file is a template image file, template image data representing the template image, and mask information defining the window Aw in the mask image corresponding to the template image. The mask information can be realized by various embodiments. The mask information may be the image data of the mask image, may be the image data representing only the window Aw, and may be a set of codes representing a shape of the window and feature points defining the size and position of the shape (e.g., coordinate of a center of a circle, coordinates of two vertices of a rectangle). When the template image data is read, the mask information corresponding to the template image data is also read.

Figure 25:
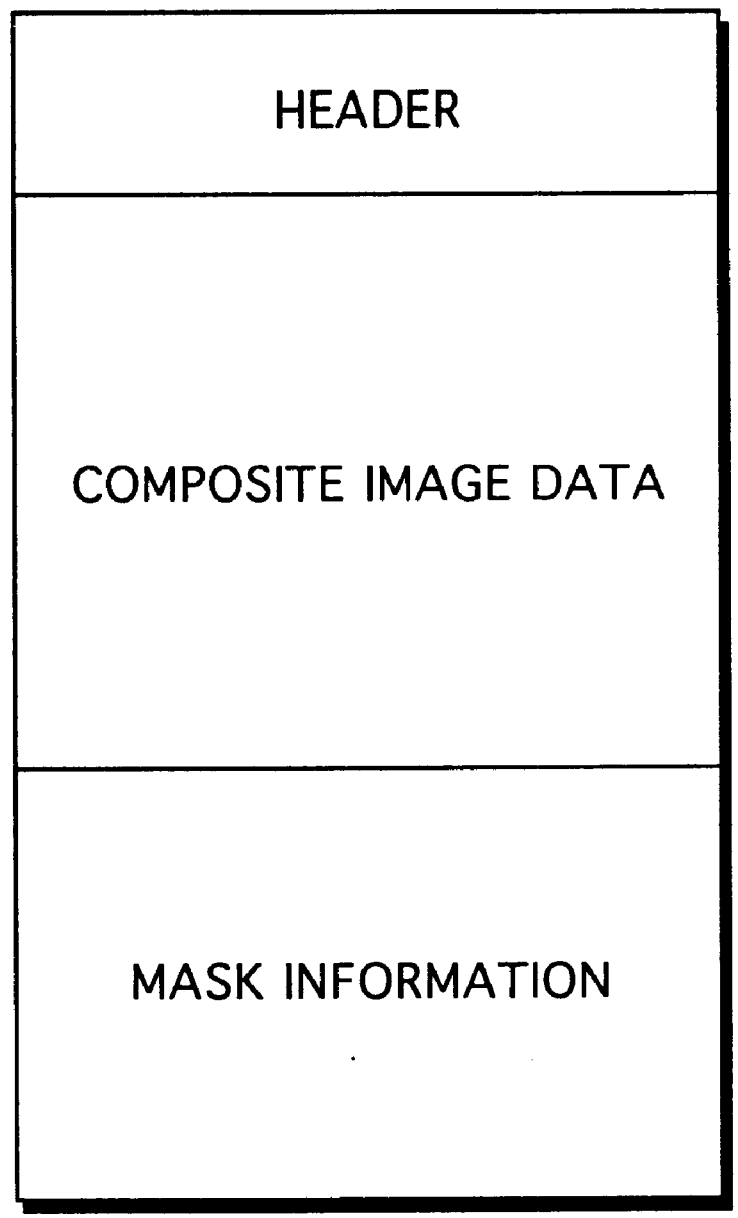
FIG. 25 illustrates the format of a composite image file.

FIG. 25 illustrates the format of the composite image file produced in the client computer 71. The composite image file stores a header indicating that the file itself is a composite image file, composite image data obtained in the image synthesis processing, and mask information used when the composite image is constructed. When the composite image data is read from the composite image file, the mask information corresponding to the composite image data is also read.

Figure 26:
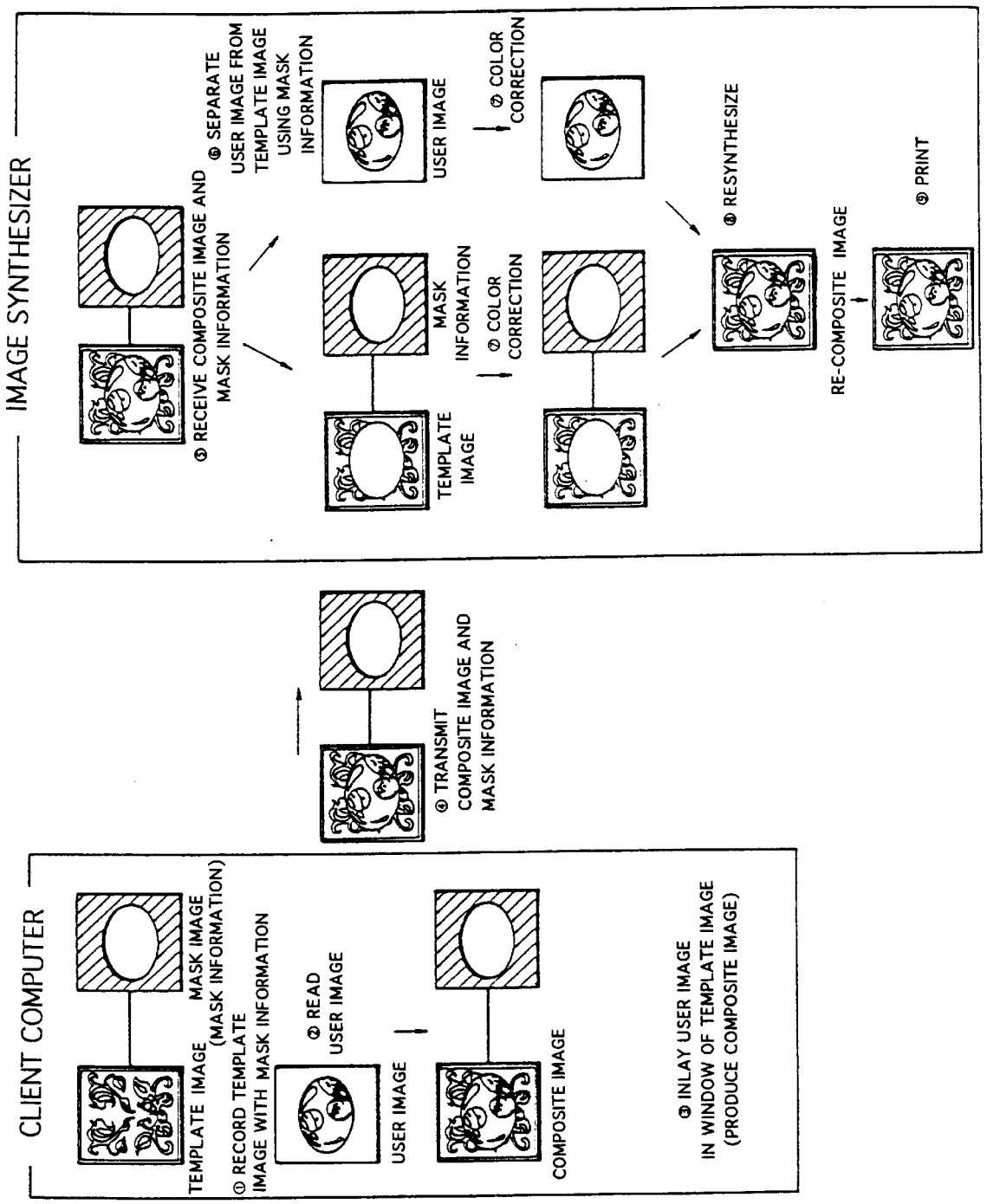
FIG. 26 schematically shows the procedure for processing for printing a composite image in an image processing system.
Figure 27:
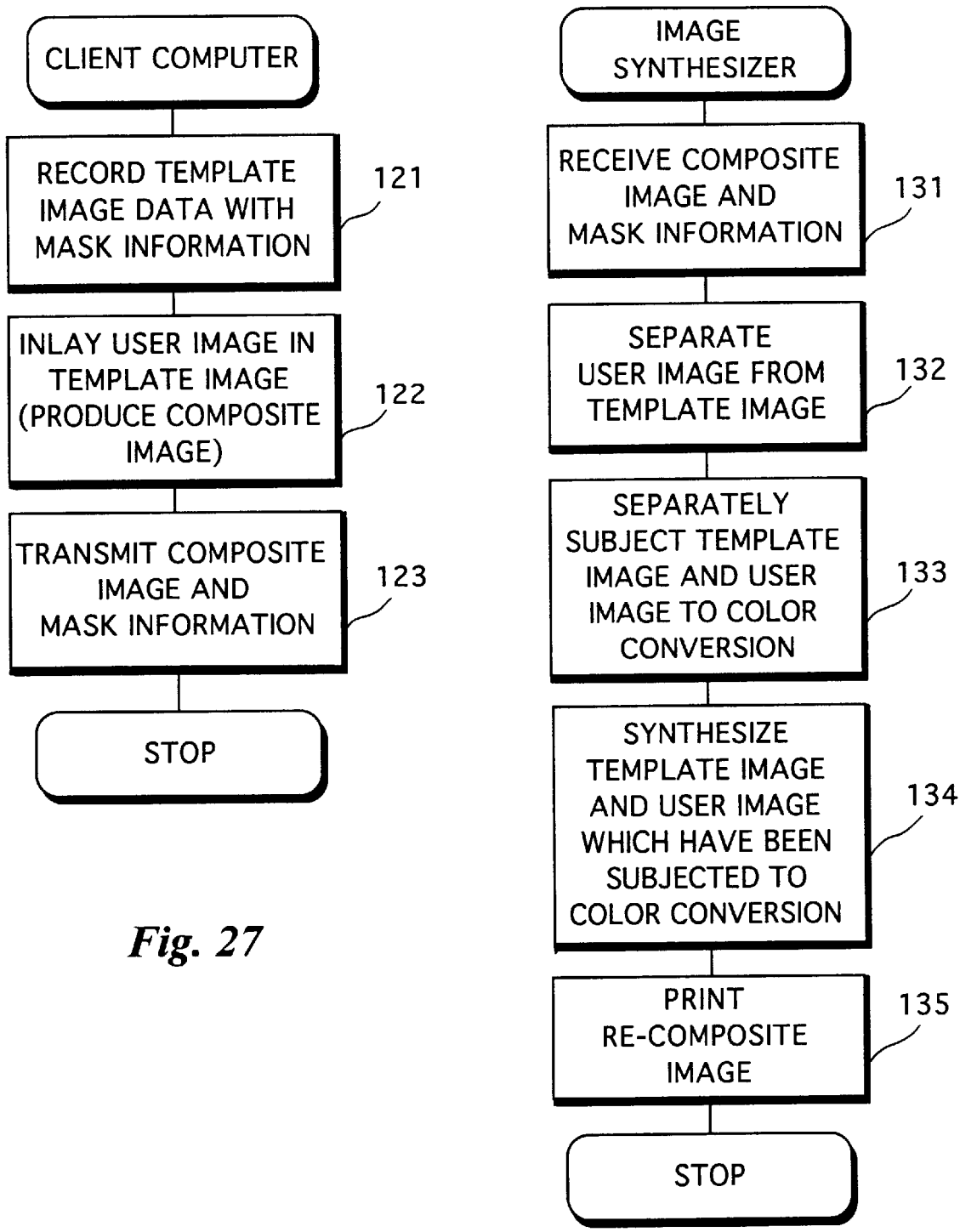
FIG. 27 is a flow chart showing the procedure for processing for printing a composite image in an image processing system.

FIG. 26 schematically illustrates the procedure for image synthesis processing in the image synthesizing system, and FIG. 27 is a flow chart showing the procedure for the image synthesis processing.

Referring mainly to these figures, description is made of processing performed when images are synthesized, separated and resynthesized in the image synthesizing system.

In the client computer 71, the template image data and the mask information are created. The created template image data and the mask information are recorded on the HD of the client computer 71 (step 121). When the template image data and the mask information have been already recorded on the HD, processing at the step 121 is skipped.

The user image data representing the user image is read by the FD drive 80 or CD-ROM drive 79, or the user image data is produced upon reading the photograph or the film, and is temporarily stored in a RAM 74. The template image data and the mask information are read from the HD, and are temporarily stored in the RAM 74. In a predetermined memory area in the RAM 74, the user image represented by the user image data or a part thereof is inlaid in the window Aw of the template image represented by the template image data, referring to the mask information, under the control of a memory controller 85. Consequently, a composite image is produced (step 122). Composite image data representing the composite image is fed to the VRAM 82. The composite image data is read from the VRAM 82 and is inputted to the display device 84 through the DA converter 83, to display the composite image.

If the composite image which the user desires is obtained, composite image data representing the composite image and mask information correlated with the composite image data are transmitted by a modem 81 to the image synthesizer 100 from the client computer 71 via the network (step 123).

In the image synthesizer 100, the composite image data transmitted from the client computer 71 and the mask information correlated with the composite image data are received via the modem 81 (step 131). The composite image data and the mask information which have been received are temporarily stored in the RAM 74 in the image synthesizer 100.

In the image synthesizer 100, the template image and the user image are separated from the composite image by referring to the mask information (step 132). This separation processing can be performed by a processing reverse to the processing in which the composite image is produced using the user image, template image and the mask information. On the RAM 74, the template image data representing the template image and the user image data representing the user image are stored in separate areas.

The user image and the template image are extracted from the composite image and are separated from each other in the following manner, for example. OR logic operation between the composite image and the mask image produces the template image having the blank portion corresponding to the window Aw. The AND logic operation produces the user image which has been inlayed in the window Aw.

The template image data representing the template image which has been separated from the user image is subjected to color correction (color conversion) performed by a CPU 72, as required. The user image data representing the user image which has been separated from the template image is subjected to color correction (color conversion) by the CPU 72, as required (step 133). Usually, the color correction (color conversion) performed on the template image data is different from that on the user image.

Consider a case where (average) brightness of the template image and (average) brightness of the user image are different from each other. If the user image and the template image different in brightness are synthesized, the produced composite image gives somewhat strange feeling. Thus, the template image and the user image are separated from the composite image in the image synthesizer 100, and the separated template image and the user image are individually subjected to brightness correction depending on the brightness of each image so that the brightens in both images harmonize with each other as a whole. The corrected template image and user image are then resynthesized. The composite image obtained by the resynthesis exhibits balanced appearance and gives good feeling.

Further, the color correction or conversion may be effected based on the user's desire. For example, the template image is converted into monochrome image and the user image is corrected to exhibit sepia color as a whole. Of course, both of the template image and the user image are not necessarily subjected to color conversion, but at least one of the images may be subjected to color conversion.

A composite image is produced again from the template image data representing the template image and the user image data representing the user image at least one of which has been subjected to the color correction using the corresponding mask information (step 134).

Composite image data representing the composite image obtained by the resynthesis is temporarily stored in the VRAM 82. The composite image data is read out from the VRAM 82, and is fed to the display device 84 through the DA converter 83. The composite image is displayed on the display device 84, and is confirmed by an operator of the image synthesizer 100.

When the composite image is confirmed by the operator, the composite image data is fed to the color printer 90A which prints the composite image under control of the printer control circuit 89 (step 135).

There is a case where the template image data is down loaded to the client computer 71 from the image synthesizer 100, and the composite image is produced using the template image data in the client computer. The template image data has already been subjected to color correction in dependence upon the characteristics of the color printer 90A in the image synthesizer 100. The user image used to produce the composite image may have not been subjected to color correction in order to be suitable for the color printer 90A. In such a case, if the user image is separated from the composite image, the separated user image can be subjected to color correction in accordance with the characteristics of the color printer 90 A. The composite image obtained by the resynthesis processing using the color-corrected user image has a proper color as a whole.

Although in the above-mentioned embodiment, the client computer 71 and the image synthesizer 100 can communicate data to each other via the network, the data communication need not necessarily be made possible. For example, a composite image may be produced in the client computer 71, and data representing the produced composite image and the mask information may be stored in a portable storage medium such as an FD and read by mounting the portable storage medium on the image synthesizer 100.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
    an image area designating device for designating an area to be extracted of an original image displayed on a display screen;
    color changing means for changing the color of an area, excluding the area to be extracted which has been designated by said image area designating device, of the displayed original image into a particular color; and
    storage controlling means for storing pixel data representing pixels having colors excluding the particular color obtained by the change in said color changing means in the displayed original image and coordinate data representing positions of the pixels in the displayed original image with the pixel data and the coordinate data correlated with each other.

2. The image processing apparatus according to claim 1, wherein
    said storage controlling means stores in a storage medium pairs of the pixel data serving as image data of the pixels composing the extracted image and coordinate data representing positions of the pixels.

3. The image processing apparatus according to claim 1, wherein said storage controlling means stores the pixel data and the coordinate data upon arranging them for each pixel.

4. The image processing apparatus according to claim 1, further comprising:
    pixel data compressing means for compressing the pixel data, and
    coordinate data compressing means for compressing the coordinate data,
    said storage controlling means storing the pixel data compressed by said pixel data compressing means and the coordinate data compressed by said coordinate data compressing means.

5. The image processing apparatus according to claim 1 further comprising:
    data reading means for reading the pixel data and the coordinate data which are stored by said storage controlling means in correlation with each other; and
    display controlling means for controlling a display device such that the image is displayed by displaying the pixels represented by the pixel data read by said data reading means in the positions represented by the coordinate data.

6. The image processing apparatus according to claim 2 further comprising:
    data reading means for reading, from the storage medium storing image data comprising a set of pairs of pixel data representing pixels and coordinate data representing the positions of the pixels on the image, the pixel data and the coordinate data; and
    display controlling means for controlling a display device such that the image is displayed by displaying the pixels represented by the pixel data read by said data reading means in the positions represented by the coordinate data.

7. The image processing apparatus according to claim 4 further comprising:
    data reading means for reading the compressed pixel data and the compressed coordinate data which are stored by said storage control means;
    pixel data expanding means for expanding the compressed pixel data read by said data reading means;
    coordinate data expanding means for expanding the compressed coordinate data read by said data reading means; and display control means for controlling a display device such that the image is displayed by displaying the pixels represented by the pixel data expanded by said pixel data expanding means in the positions represented by the coordinate data expanded by said coordinate data expanding means.

8. The image processing apparatus according to claim 4, wherein said storage controlling means stores in a storage medium the compressed pixel data and compressed coordinate data.

9. The image processing apparatus according to claim 8 further comprising:

data reading means for reading, from the storage medium, the compressed pixel data and the compressed coordinate data;

pixel data expanding means for expanding the compressed pixel data read by said data reading means;

coordinate data expanding means for expanding the compressed coordinate data read by said data reading means; and display control means for controlling a display device such that the image is displayed by displaying the pixels represented by the pixel data expanded by said pixel data expanding means in the positions represented by the coordinate data expanded by said coordinate data expanding means.

10. The image processing apparatus according to claim 1 further comprising means for subjecting coordinate data which is stored by said storage controlling means to coordinate conversion.

11. An image processing method comprising the steps of:

designating an area to be extracted of an original image displayed on a display screen;

changing the color of an area, excluding the designated area to be extracted, of the displayed original image into a particular color; and storing pixel data representing pixels having colors excluding the particular color obtained by the change in the displayed original image and coordinate data representing positions of the pixels in the displayed original image with the pixel data and the coordinate data correlated with each other.

12. The image processing method according to claim 8 further comprising the steps of:

reading the pixel data and the coordinate data which are stored in correlation with each other; and controlling a display device such that the image is displayed by displaying the pixels represented by the read pixel data in the positions represented by the corresponding read coordinate data.

13. The image processing method according to claim 11 further comprising the steps of:

reading the pixel data and the coordinate data which are stored in correlation with each other, compressing a set of the read pixel data and compressing a set of the read coordinate data, and storing in a storage medium the compressed pixel data and the compressed coordinate data.

14. The image processing method according to claim 13 further comprising the steps of:

reading, from the storage medium, the compressed pixel data and the compressed coordinate data;

expanding the read compressed pixel data;

expanding the read compressed coordinate data; and controlling a display device such that the image is displayed by displaying the pixel represented by the expanded pixel data in the positions represented by the expanded coordinate data.

* * * * *